(12) United States Patent
Thorsell et al.

(10) Patent No.: US 10,539,810 B2
(45) Date of Patent: Jan. 21, 2020

(54) MAGNETIC ATTACHMENT MECHANISM FOR EYEWEAR

(71) Applicant: Smith Optics, Inc., Portland, OR (US)

(72) Inventors: Eric Thorsell, Portland, OR (US); Matt Capozzi, Bend, OR (US); Nicolas Ramirez, Portland, OR (US); Michael Qualls, Portland, OR (US); Scott Layton, Portland, OR (US); Sean Nemoto, Portland, OR (US); James Andrew Chilson, Ketchum, ID (US)

(73) Assignee: Smith Optics, Inc., Portland, OR (US)

( * ) Notice: Subject to any disclaimer, the term of this patent is extended or adjusted under 35 U.S.C. 154(b) by 0 days.

(21) Appl. No.: 16/267,127

(22) Filed: Feb. 4, 2019

(65) Prior Publication Data

US 2019/0171033 A1 Jun. 6, 2019

Related U.S. Application Data

(63) Continuation of application No. 15/449,616, filed on Mar. 3, 2017, now Pat. No. 10,197,814.

(51) Int. Cl.
*G02C 1/02* (2006.01)
*G02C 5/14* (2006.01)
(Continued)

(52) U.S. Cl.
CPC .............. *G02C 5/146* (2013.01); *G02C 1/02* (2013.01); *G02C 1/04* (2013.01); *G02C 1/08* (2013.01);
(Continued)

(58) Field of Classification Search
CPC ........ G02C 2200/02; G02C 1/02; G02C 5/22; G02C 1/04
(Continued)

(56) References Cited

U.S. PATENT DOCUMENTS

| D47,916 S | 10/1915 | Fenno |
|---|---|---|
| 1,335,823 A | 4/1920 | Day |

(Continued)

FOREIGN PATENT DOCUMENTS

| EP | 2674138 A1 | 12/2013 |
|---|---|---|
| KR | 200350086 Y1 | 4/2004 |

(Continued)

OTHER PUBLICATIONS

Examiner's Report issued by the Canadian Intellectual Property Office for CA application No. 2,996,756 dated Dec. 28, 2018.
(Continued)

*Primary Examiner* — Hung X Dang
(74) *Attorney, Agent, or Firm* — Dorsey & Whitney LLP

(57) ABSTRACT

Interchangeably lenses and attachment assemblies for eyewear with removable temples are described. An example attachment assembly for removably magnetically attaching an eyewear temple to a lens may include a magnetic latch having a first latch portion and a second latch portions movably (e.g., pivotably) coupled to the temple. The first and second latch portions may be configured to be positioned on opposite sides of the lens by a carrier. The first and second latch portions may be configured to magnetically attract one another in a magnetic attraction direction. The carrier may be configured to restrict movement of at least one of the first and second latch portions in a second direction opposite the magnetic attraction direction.

20 Claims, 22 Drawing Sheets

(51) Int. Cl.
　　*G02C 1/08*　　　　(2006.01)
　　*G02C 5/10*　　　　(2006.01)
　　*G02C 1/04*　　　　(2006.01)
　　*G02C 5/12*　　　　(2006.01)
　　*G02C 5/22*　　　　(2006.01)

(52) U.S. Cl.
　　CPC ............... *G02C 5/10* (2013.01); *G02C 5/126* (2013.01); *G02C 5/22* (2013.01); *G02C 2200/02* (2013.01); *G02C 2200/04* (2013.01); *G02C 2200/06* (2013.01); *G02C 2200/08* (2013.01)

(58) Field of Classification Search
　　USPC .................................................. 351/110, 116
　　See application file for complete search history.

(56) References Cited

U.S. PATENT DOCUMENTS

| | | |
|---|---|---|
| 1,581,100 A | 4/1926 | Clulee et al. |
| 2,844,071 A | 7/1958 | Schumacher et al. |
| D198,939 S | 8/1964 | Huggins |
| D199,933 S | 12/1964 | Shindler |
| D204,957 S | 5/1966 | Dym |
| 5,035,498 A | 7/1991 | Bolle |
| D324,058 S | 2/1992 | Longsdorf et al. |
| D348,681 S | 7/1994 | Conway |
| 5,387,949 A | 2/1995 | Tackles |
| D367,667 S | 3/1996 | Simioni et al. |
| D370,021 S | 5/1996 | Simioni et al. |
| 5,602,603 A | 2/1997 | Bondet |
| 5,617,588 A | 4/1997 | Canavan et al. |
| 5,659,381 A | 8/1997 | Simioni |
| D387,792 S | 12/1997 | Bondet |
| 5,936,701 A | 8/1999 | Sartor |
| 6,086,199 A | 7/2000 | Holland et al. |
| 6,224,209 B1 | 5/2001 | Chen |
| 6,592,220 B1 | 7/2003 | Cheong |
| D478,929 S | 8/2003 | Baden et al. |
| 6,641,265 B1 | 11/2003 | Hou |
| 6,863,395 B1 | 3/2005 | Teng |
| 7,175,276 B1 | 2/2007 | Hsiung |
| 7,192,135 B1 | 3/2007 | Cheng |
| D543,572 S | 5/2007 | Yee et al. |
| 7,222,958 B1 | 5/2007 | Chiou |
| D547,794 S | 7/2007 | Jannard et al. |
| D548,269 S | 8/2007 | Baden et al. |
| 7,384,142 B2 | 6/2008 | Durand |
| D573,172 S | 7/2008 | Baden et al. |
| 7,431,453 B2 | 10/2008 | Hogan |
| 7,458,680 B1 | 12/2008 | Cheng |
| 7,497,569 B2 | 3/2009 | Webb |
| 7,553,013 B2 | 6/2009 | Tsai |
| D595,757 S | 7/2009 | Yang |
| 7,594,280 B2 | 9/2009 | Lindahl |
| D604,759 S | 11/2009 | Rohrbach et al. |
| 7,645,039 B2 | 1/2010 | Sheldon |
| D610,603 S | 2/2010 | Thixton |
| 7,661,815 B2 | 2/2010 | Lipawsky |
| 7,712,895 B2 | 5/2010 | Wang |
| 7,797,765 B2 | 9/2010 | Musal et al. |
| 7,896,491 B1 | 3/2011 | Lin |
| 7,922,320 B1 | 4/2011 | Tsai |
| 8,047,649 B2 | 11/2011 | Chen |
| 8,182,086 B2 | 5/2012 | Cheong |
| 8,192,015 B2 | 6/2012 | Taylor et al. |
| D663,764 S | 7/2012 | Serlenga |
| 8,246,165 B2 | 8/2012 | Hadehara |
| 8,303,111 B2 | 11/2012 | Lin |
| 8,430,506 B2 | 4/2013 | Chen |
| 8,469,510 B2 | 6/2013 | Beleby et al. |
| D685,409 S | 7/2013 | Sheldon |
| 8,480,226 B2 | 7/2013 | Ifergan |
| 8,596,780 B2 | 12/2013 | Li |
| 8,613,515 B2 | 12/2013 | Earley |
| D697,963 S | 1/2014 | Earley |
| 8,641,188 B2 | 2/2014 | DiChiara |
| 8,668,330 B2 | 3/2014 | Reyes et al. |
| 8,702,232 B2 | 4/2014 | Chen |
| 8,746,877 B2 | 6/2014 | Belbey et al. |
| D710,432 S | 8/2014 | Votel et al. |
| 8,832,904 B2 | 9/2014 | Kidouchim |
| D717,363 S | 11/2014 | Moritz |
| D719,209 S | 12/2014 | Garfias |
| 8,905,539 B2 | 12/2014 | Chen |
| 8,911,076 B2 | 12/2014 | Calilung et al. |
| 8,915,586 B2 | 12/2014 | Porter |
| 8,960,896 B2 | 2/2015 | Chou et al. |
| D725,696 S | 3/2015 | Garfias |
| 8,992,007 B2 | 3/2015 | Li |
| D727,405 S | 4/2015 | Damin et al. |
| D728,002 S | 4/2015 | Uhm |
| 9,004,679 B2 | 4/2015 | Chen |
| 9,010,928 B2 | 4/2015 | Fuchs et al. |
| 9,016,855 B2 | 4/2015 | Chen |
| D728,664 S | 5/2015 | Yoo |
| D729,305 S | 5/2015 | Garfias |
| D730,431 S | 5/2015 | Yoo |
| 9,104,043 B2 | 8/2015 | Crescenzi et al. |
| D739,457 S | 9/2015 | Moritz |
| 9,188,792 B2 | 11/2015 | Calilung et al. |
| 9,192,519 B2 | 11/2015 | Tobia |
| D746,368 S | 12/2015 | Uhm |
| 9,207,464 B2 | 12/2015 | Schmidt |
| D749,670 S | 2/2016 | Shin |
| 9,261,711 B1 | 2/2016 | Chen |
| D752,678 S | 3/2016 | Thixton |
| 9,279,999 B1 | 3/2016 | Weng et al. |
| D755,883 S | 5/2016 | Yang |
| D756,446 S | 5/2016 | Yoo |
| 9,345,622 B2 | 5/2016 | McNeal et al. |
| D759,151 S | 6/2016 | Yoo |
| D763,944 S | 8/2016 | Shin |
| D763,949 S | 8/2016 | Shin |
| D774,123 S | 12/2016 | Chae |
| D778,340 S | 2/2017 | Garfias |
| D779,583 S | 2/2017 | Garfias |
| D783,080 S | 4/2017 | Garfias |
| D783,081 S | 4/2017 | Uhm |
| D783,707 S | 4/2017 | Uhm |
| D783,708 S | 4/2017 | Chae |
| D785,079 S | 4/2017 | Uhm |
| D785,700 S | 5/2017 | Thixton |
| D799,587 S | 10/2017 | Thixton |
| D810,183 S | 2/2018 | Garfias |
| 10,197,814 B2 * | 2/2019 | Thorsell .................. G02C 1/02 |
| 2011/0109873 A1 | 5/2011 | Ogren et al. |
| 2011/0157542 A1 | 6/2011 | Tsai |
| 2011/0194065 A1 | 8/2011 | Belbey et al. |
| 2011/0225709 A1 | 9/2011 | Saylor et al. |
| 2012/0218507 A1 | 8/2012 | Calilung et al. |
| 2013/0321757 A1 | 12/2013 | Chen |
| 2014/0063439 A1 | 3/2014 | Chen |
| 2014/0098337 A1 | 4/2014 | Chen |
| 2014/0157496 A1 | 6/2014 | Ginther et al. |
| 2014/0300854 A1 | 10/2014 | Fox |
| 2015/0022774 A1 | 1/2015 | Chen |
| 2015/0301359 A1 | 10/2015 | Lipawsky |
| 2015/0338678 A1 | 11/2015 | Fafaul et al. |
| 2015/0370088 A1 | 12/2015 | Damin et al. |
| 2016/0103332 A1 | 4/2016 | Lin |
| 2016/0116760 A1 | 4/2016 | Chen |
| 2016/0178927 A1 | 6/2016 | Yang |
| 2016/0178929 A1 | 6/2016 | Chen |
| 2016/0216533 A1 | 7/2016 | Calilung et al. |
| 2016/0223840 A1 | 8/2016 | Chute et al. |
| 2016/0231597 A1 | 8/2016 | Tipp et al. |
| 2017/0045754 A1 | 2/2017 | Rubaud et al. |

(56) References Cited

U.S. PATENT DOCUMENTS

2018/0008467 A1    1/2018  Cater et al.
2018/0252938 A1    9/2018  Thorsell et al.

FOREIGN PATENT DOCUMENTS

TW      M287948 U       2/2006
WO      2008003743 A1   1/2008
WO      2010113036 A2   10/2010

OTHER PUBLICATIONS

Sunglasses Hut Catalog, p. 4 Sunglasses "E".
U.S. Appl. No. 15/449,616, entitled: "Magnetic Attachment Mechanism for Eyewear" filed Mar. 3, 2017.
U.S. Appl. No. 29/596,022, entitled: "Eyewear" filed Mar. 3, 2017.
"http://www.smithoptics.com/Root/Men's/Sunglasses/New/PIVLOCK-OVERDRIVE/p/OVPCDMBK", Sep. 2013.

* cited by examiner

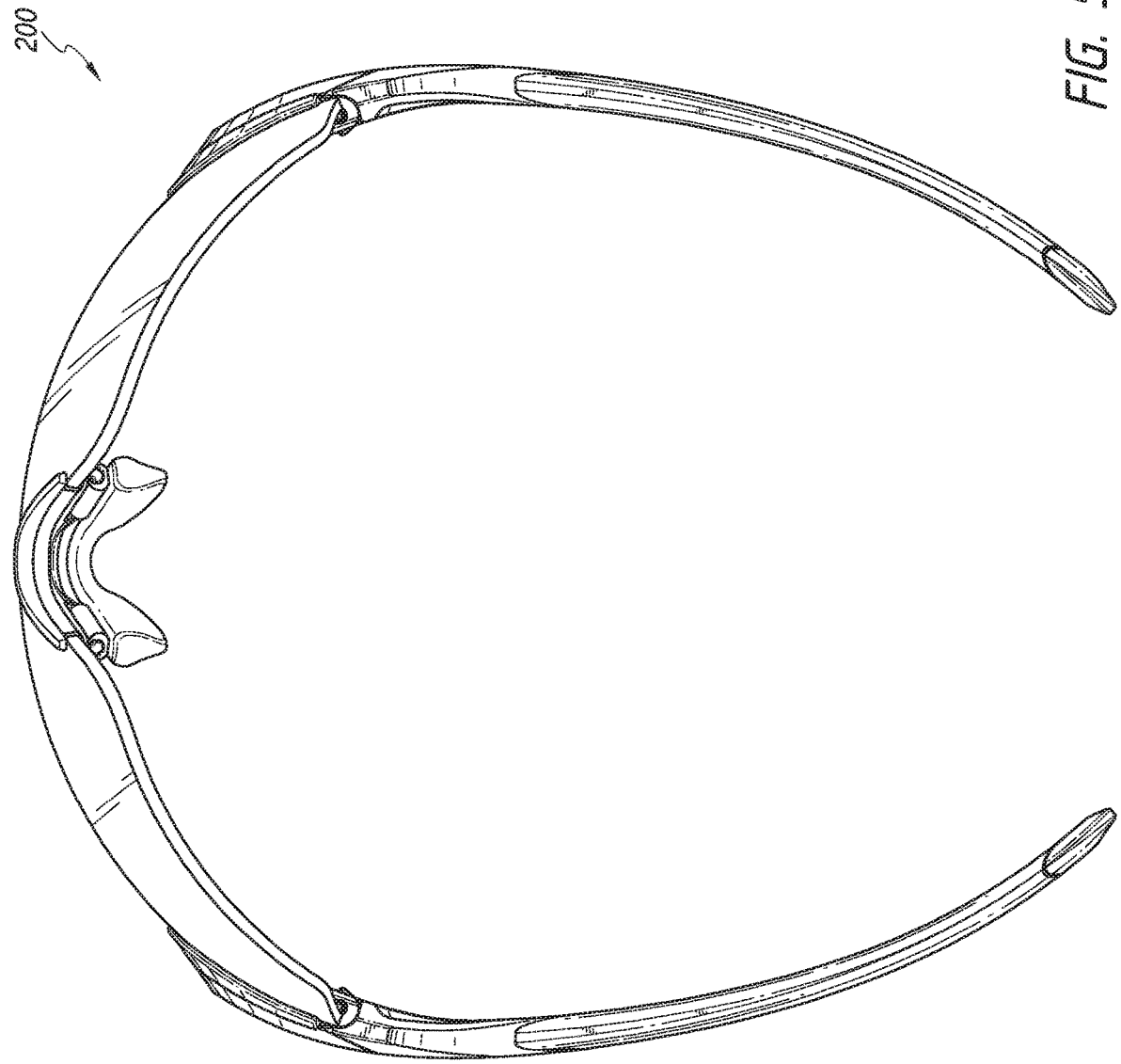

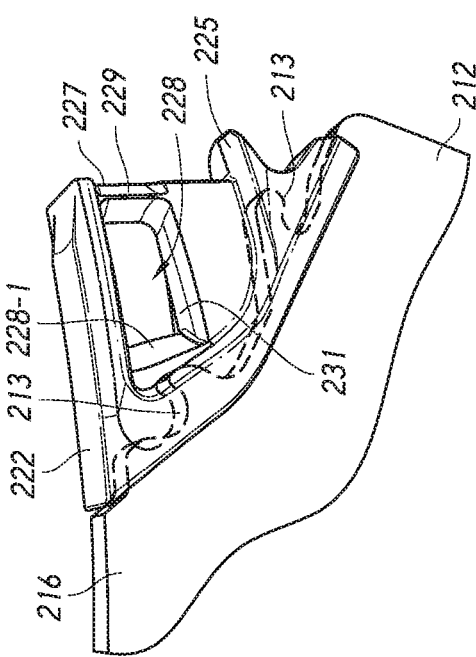
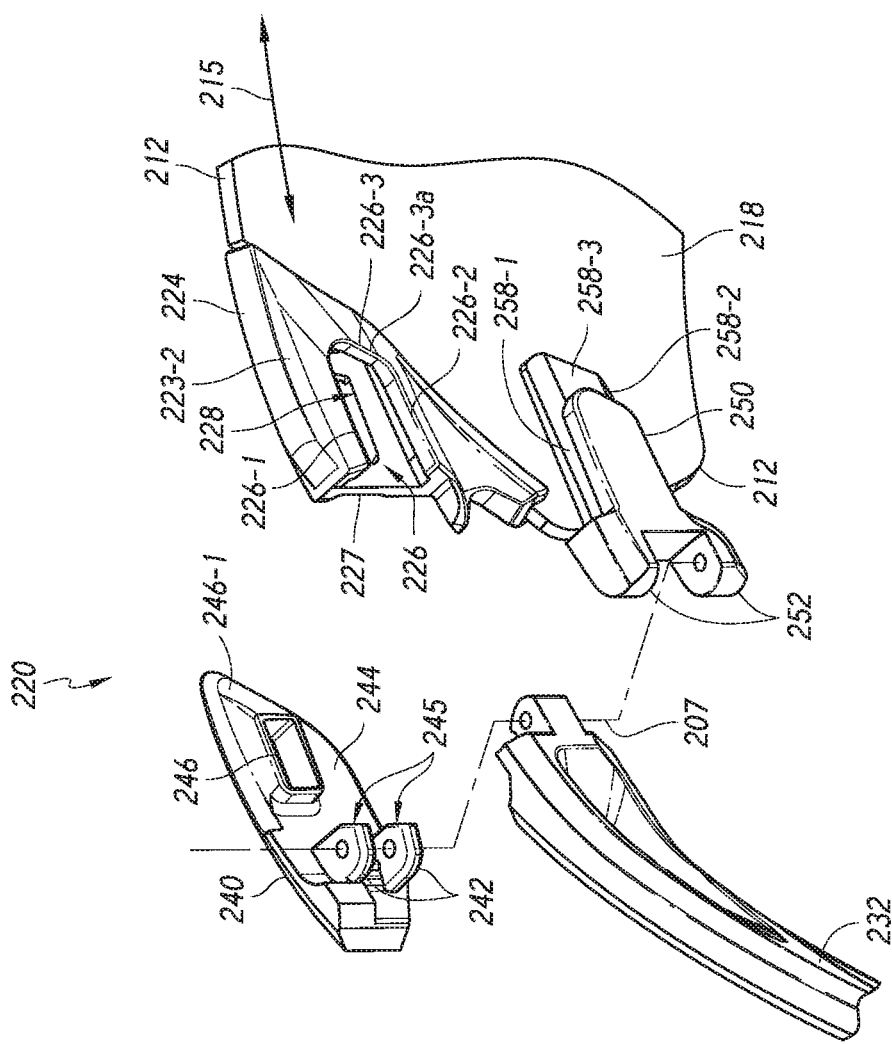
FIG. 9
FIG. 8

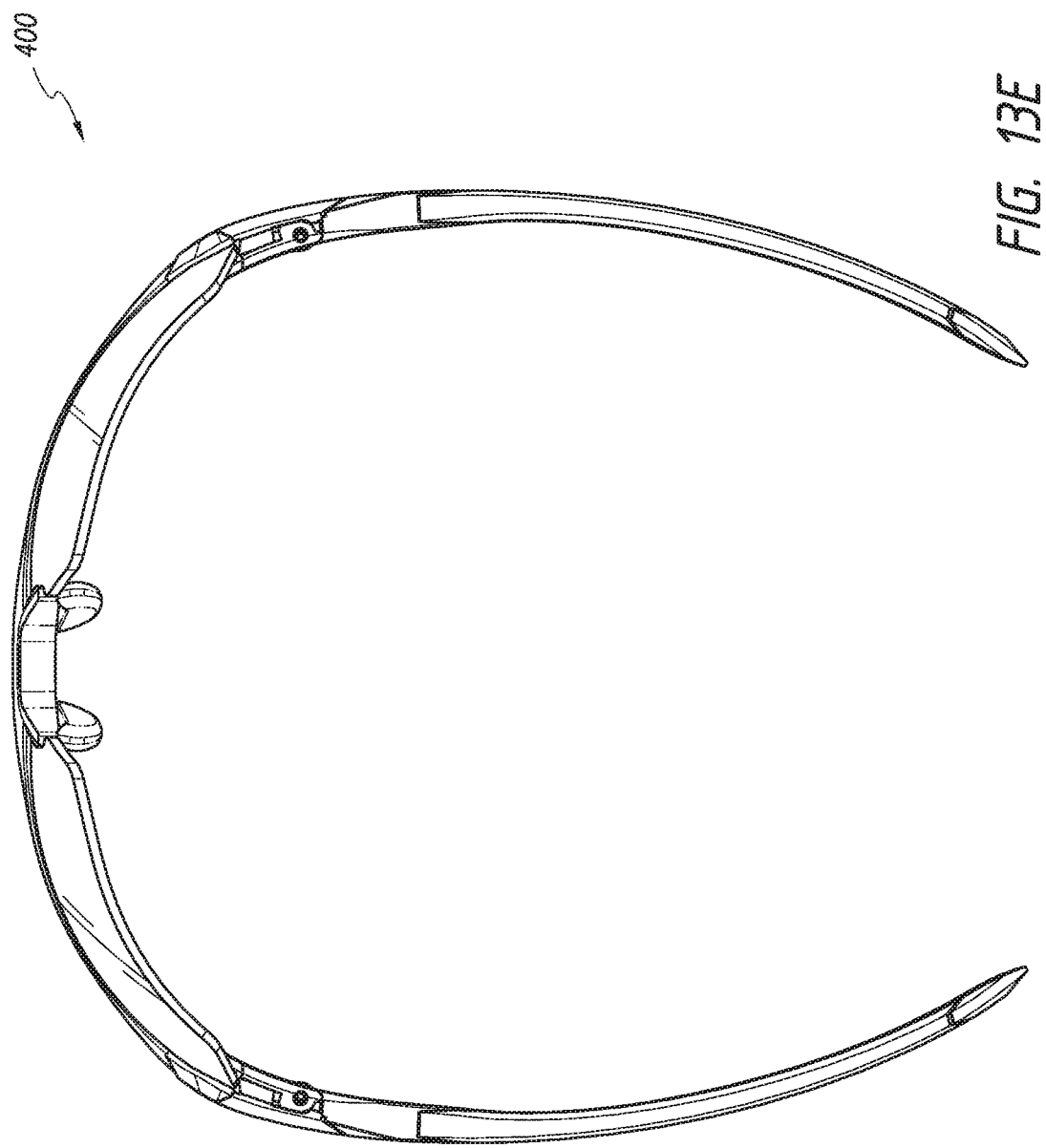

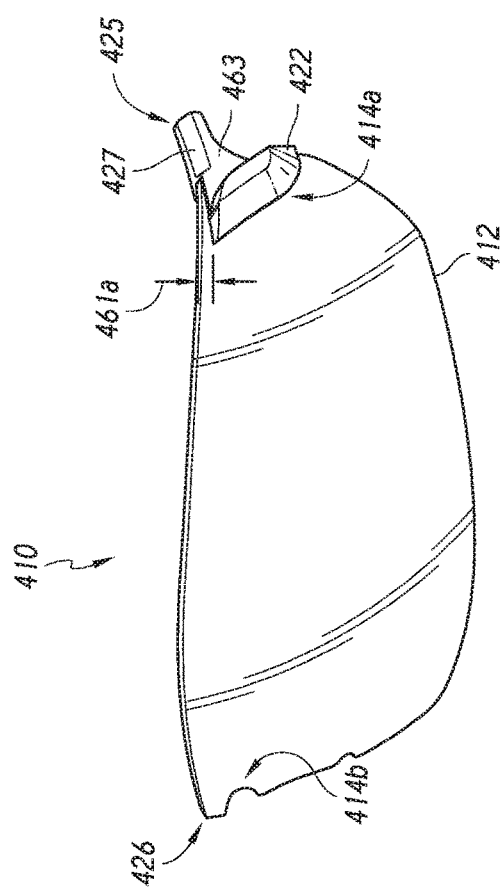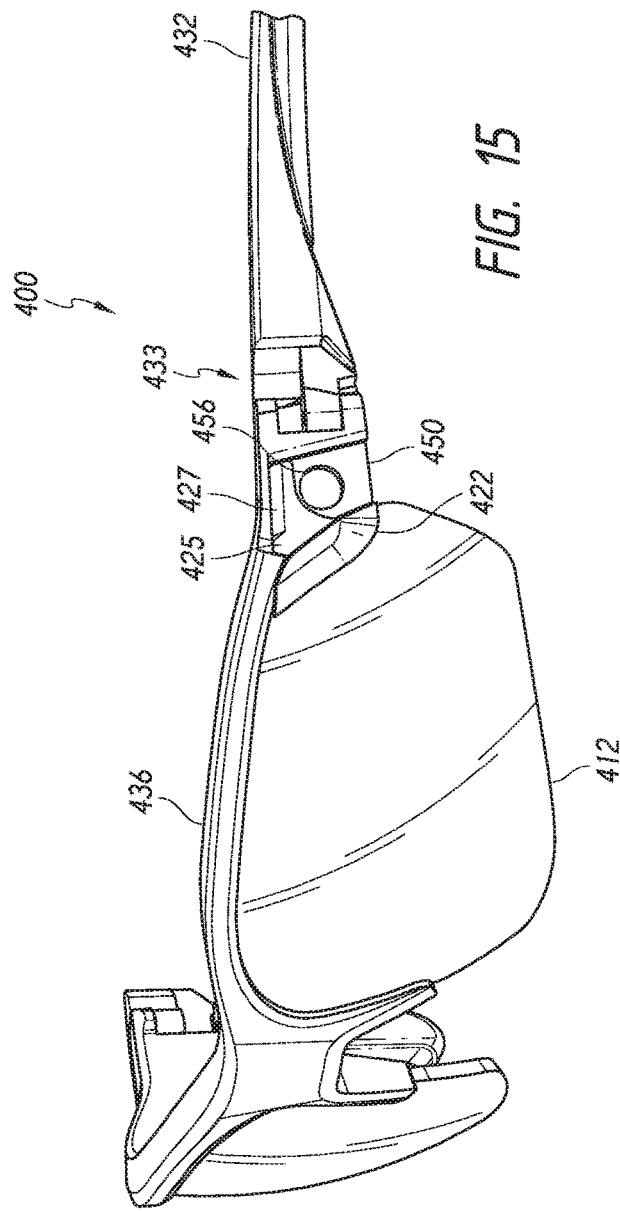

MAGNETIC ATTACHMENT MECHANISM FOR EYEWEAR

CROSS-REFERENCE TO RELATED APPLICATION(S)

This application is a continuation of U.S. application Ser. No. 15/449,616, filed Mar. 3, 2017, now U.S. Pat. No. 10,197,814 which is incorporated herein by reference, in its entirety, for any purpose.

BACKGROUND

Eyewear with replaceable lenses typically include a frame and one or more removable lenses. The frame may enclose the lens fully (i.e., extend around the entire circumference of the lens), in which case the frame may be equipped with a mechanism to allow the frame to be opened for removing the lens. In some cases, the frame may partially enclose the lens, in which case the frame may include a retention mechanism to retain the lens in place during use. Some examples of eyewear in which individual temples are removable from the lens have been developed. However, in existing eyewear of this kind, the coupling mechanism between the lens and eyewear may be unduly complex or cumbersome for a user to operate, or may have other deficiencies which result in a suboptimal user experience. Thus, improvements in eyewear with removable lenses may be desired.

BRIEF DESCRIPTION OF THE DRAWINGS

FIG. 1 is a block diagram of an eyewear in accordance with the present disclosure.

FIGS. 5B and 5C are a rear and bottom views of the eyewear in FIG. 2

FIG. 8 is a partial exploded rear isometric view of components of the eyewear of FIG. 6.

FIG. 9 is a partial view of a lens assembly according to the present disclosure.

FIGS. 13B-13F are additional views of the eyewear of FIG. 13A, including front, rear, top, bottom, and side views.

FIG. 14 is a view of a lens assembly in accordance with the present disclosure.

FIG. 15 is a partial view of the eyewear of FIG. 13 with one or more components removed to illustrate features and/or functions of the lens attachment mechanism.

DETAILED DESCRIPTION

Examples of eyewear with removable lenses are described. In some examples, the eyewear may include an attachment assembly for coupling the lens to a frame and/or to individual temples. In some embodiments the attachment assembly may include one or more magnets for coupling the lens to a frame and/or to individual temples, and may thus be interchangeably referred to as magnetic attachment assembly.

Figure 1:
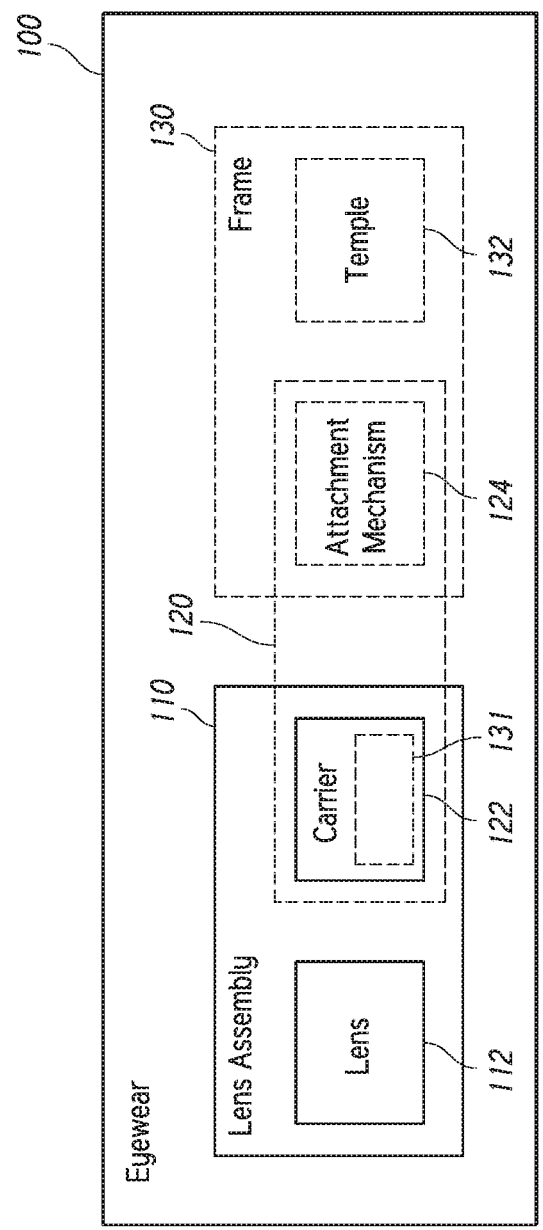
FIG. 1 is a The description will be more fully understood with reference to the following figures in which components may not be drawn to scale, which are presented as various embodiments of the eyewear and eyewear components described herein and should not be construed as a complete depiction of the scope of the present disclosure.

As shown in FIG. 1, an example eyewear 100 includes a lens assembly 110 and an attachment assembly 120 for removably coupling the lens assembly to a temple 132. The lens assembly 110 may include a lens 112 and at least one carrier 122. The attachment assembly 120 may include an attachment mechanism 124 and a carrier 122 which is attached to the lens 112. The attachment mechanism 124 may be attached to a temple 132, which may be individually removable from the lens, or incorporated within a frame 130. In the case of removable temples, a pair of attachment mechanisms 124 may be attached to a medial portion of each temple. The attachment mechanism 124 may include at least one pivotable component to allow the attachment mechanism 124 to be removably attached to the carrier 122 and thus to the lens 112. The carrier 122 may include at least one seat 131 which may function to locate the attachment mechanism 124 relative to the carrier 122 and thus the lens assembly 110. The seat 131 may thus be configured to position the attachment mechanism 124 in a predetermined location with respect to the carrier 122. In some embodiments, the seat 131 may align the attachment mechanism 124 in a predetermined orientation with respect to the carrier 122. In some embodiments, the seat 131 may be configured to receive a portion of the attachment mechanism 124, such as a portion of the pivotable component, therein. In some embodiments, the seat 131 may be defined by one or more walls, passages, the contours of the surfaces of the one or more walls, passages, or any combinations thereof. When the attachment mechanism 124 is engaged with the carrier 122, such as to secure the lens 112 to a temple 132 or to the frame 130, the attachment mechanism 124 may be biased toward the engaged or closed position, for example using magnetic force acting between a pair of magnetic materials positioned on opposing faces of the attachment mechanism 124. The carrier 122 may be configured to resist separation of the attachment mechanism 124 when engaged with the carrier 122, such as by restricting movement of one or more components of the attachment mechanism 124 in a direction opposite the direction of magnetic attraction, as will be further described below.

The eyewear 100 may be of a single lens (or shield-type) design or a dual lens design. A single lens eyewear may include a single or unitary lens (also referred to as a lens shield), which may include left and right lens portions configured to extend in the field of view of the left and right eyes of the user when worn. The unitary lens may be formed from a single lens blank and may thus be devoid of any seams or other discontinuities in the lens. This may provide a larger unobstructed field of view through the lens. In accordance with some embodiments of the present disclosure, a unitary lens may include first and second end portions, which may be located at opposite ends of the lens. A carrier 122 may be attached to each of the first and second end portions. Each carrier 122 may be a separate component, which may be made from a different material than the lens. For example, the lens may be made from polycarbonate (PC), acrylic, or other materials which can provide suitable optical qualities (e.g., optical clarity) to the optical portion of the eyewear. The carrier 122 may be formed from an injection moldable plastic, such as Acrylonitrile Butadiene Styrene (ABS), an ABS/PC blend, High Density Polyethylene (HDPA), Thermoplastic Polyester Resin (PET), nylon, and others. Generally, any plastic material which provides good dimensional stability or stiffness may be suitable for forming an injection molded carrier. In other examples, the carriers may be manufactured using other techniques, such as additive manufacturing (i.e., 3D printing) or machining, using materials known in the art to be suitable for such forming techniques. After forming, the carriers 122 may be attached to the lens 112. In some examples, the carrier(s) may be attached to the lens while forming the carrier(s) such as through an over-molding process. Generally, to minimize distortion of the optical portion of the eyewear, the carriers are separately formed and are then attached to the optical element (i.e., the lens). In some embodiments, the carrier(s) may be fixedly attached to the lens, which generally implies that the carrier(s) are not be intended to be removed during normal use of the eyewear. For example, the carrier(s) may be bonded to the lens. In some examples, the carrier(s) may additionally or alternatively be mechanically coupled to the lens. For example, the lens 112 may include features for mechanically interlocking with corresponding features of the carrier 122. In some examples, the lens 112 may include retention features (e.g., protrusion, hooks, or other surface or edge features) which may be configured to interlock with the carrier such as to resist separation of the carrier from the lens. In some examples the carriers may be attached to the lens with fastening hardware such as screws, rivets, pins.

In some embodiments, a separate carrier is attached to each of the opposite sides of the lens (e.g., to the first and second end portions). In the illustrated embodiments, the carriers may generally extend along a small portion of the periphery of the lens, although it is envisioned that in some embodiments, the carriers may be connected, such as by extending substantially along the top, the bottom portion of the lens, or along the entire or substantially the entire periphery of the lens. In the case of a dual lens design, the eyewear may include two lenses (i.e., left and right lens) and a single carrier may be attached to each lens, for example to one side of each of the two lenses, as will be further described for example with reference to FIGS. 13-18.

The eyewear 100 may include a pair of temples 132. In some examples, the temples 132 may be removably attachable to the lens 112 via the attachment assembly 120. In some examples, each temple 132 may be individually removably attachable to a respective one of the first and second end portions of a unitary lens. In some examples, the temples 132 may be part of a frame 130. When forming part of a frame, the temples may be individually coupled to the frame 130, such as to a rim portion of the frame which is configured to at least partially enclose the lens 112. In some examples (e.g., in a single lens or dual lens eyewear), the temples may be pivotally coupled to the one or more lenses. For example, in the case of a rimmed design, the temples may be rigidly or pivotally coupled to the rim portion of the frame. The temples may have any shape (e.g., generally rounded or otherwise curved such as to conform to the user's head). The temples and/or other portions of the frame may be formed of a variety of materials as is known in the art, for example metal, plastic (e.g., injection molded or laminated plastic materials), composite materials, or combinations thereof. The temples may include soft polymeric materials, such as an elastomeric material, (e.g., for comfort) typically along a distal portion of the temple which is designed to rest against the user's head and/or ears.

An attachment mechanism 124 may be coupled to or proximate each of the temples 132. In some examples, one or more components of the attachment mechanism 124 may be pivotally coupled to the temple 132, the frame 130, or both. For example, the attachment mechanism may include a first portion (e.g., a lever portion), which is movably (e.g., pivotally) coupled to a second (e.g., tab or backing) portion (e.g., tab or backing portion) of the attachment mechanism 124. The attachment mechanism 124 may be configured to be provided between an open and closed configuration such as by moving (e.g., pivoting) the first portion relative to the second portion from a closed position, in which the attachment mechanism 124 is configured to retain the lens assembly 110 and thus lens 112 in engagement with the temple 132, to an open position, in which the lens assembly 110 and thus lens 112 may be attached or detached from the temple 132. In some embodiments, the first and/or the second portion of the attachment mechanism may be pivotally coupled to the temple in addition to being pivotable to one another. In some embodiments, the first and/or the second portion of the attachment mechanism may be pivotally coupled to the temple at the temple pivot axis (also referred to as temple hinge axis or hinge line). While using a common pivot axis for the temple hinge and the pivotal components of the attachment mechanism may provide a more compact design, in other embodiments it is envisioned that the attachment mechanism and temple hinge pivot at different axes, for example the temple hinge axis may be located distally from the pivot axis of the attachment mechanism.

In some embodiments, the attachment assembly 120 may be configured to allow the first and second portions of the attachment mechanism 124 to be in contact with one another in the closed configuration. For example, the carrier 122 may include a passage that connects the opposite sides of the carrier and which may enable at least part of the attachment mechanism 124 to pass through the carrier 122 when the attachment mechanism 124 is engaged therewith. The passage may be generally circular, rectangular, triangular or otherwise-shaped. The attachment assembly 120 may be configured to cause the first (e.g., lever) portion to temporarily move (e.g., pivot) away from the second portion during attachment or removal of the lens 112. For example, the carrier 122 and/or the attachment mechanism 124 may include ramp features which may cooperate to cause the first and second portions of the attachment mechanism 124 to separate as the attachment mechanism 124 is advanced toward the carrier 122, e.g., without the application of user force to cause the separation other than the force applied to advance the attachment mechanism 124 toward the carrier 122.

In some embodiments, the attachment mechanism 124 may be a magnetic attachment mechanism. For example, the attachment mechanism 124 may include a pair of magnetic materials attached to respective ones of the first and second portions of the attachment mechanism 124. In embodiments herein, the magnetic materials may be recessed into a cavity and have one or more surfaces exposed (e.g., the facing surfaces of the magnets) or they may be substantially enclosed in pockets or slots formed within the first and/or second portions. In some embodiments, either one of the first and second portions may be formed substantially entirely of a magnetic material. For example, the second portion, which may be a generally plate like structure in some embodiments, may be formed substantially entirely of magnetic material (e.g., a permanent magnet or ferromagnetic material, which may be shaped to slidably engage the carrier as described herein). In some embodiments, the pivotable portion may additionally or alternatively be formed substantially entirely out of a magnetic material which includes features of the first portion as described herein. In yet further embodiments, either of the first and second portions need not be plate-like structures and may be implemented using any suitable structure that is configured to engage the carrier as described herein. The attachment mechanism 124 may include at least one magnet (e.g., a permanent magnet such as a rare earth magnet) and a magnetic material (e.g., ferromagnetic metal such as iron or steel). In some examples, the attachment mechanism 124 may include a pair of magnets (e.g., neodymium magnets) attached to the opposing (i.e. facing) sides of the first and second portions of the attachment mechanism 124. The magnetic materials (e.g., magnet and ferromagnetic material or pair of magnets) may be arranged on opposing sides of the first and second portions to urge the first portion in a first direction towards the second portion, thus allowing the first (e.g., lever) portion to return to the closed position. The use of two magnets in some embodiments may provide additional centering function (e.g., resulting from the magnets' natural tendency to axially align their respective fields to one another), which may enhance the alignment and reduce free play between the separable components of the eyewear 100.

In some embodiments, the attachment assembly 120 may be configured to enable the first portion to return to the closed position after the lens 112 has been attached or detached from the temple 132. For example, the attachment assembly 120 may include one or more stop features, which may limit the separation of the first and second portions to a predetermined amount, for example limiting the angle between the first and second portions to up to 25 degrees. In some embodiments, the separation angle may be limited to up to 30 degrees or greater depending on the force of magnetic attraction between the pivotal portions of the attachment mechanism. The stop features may be configured to limit the separation (e.g., separation angle) to a sufficient amount to allow the attachment mechanism to separate from the carrier while maintaining the pivotal portions of the attachment mechanism within the effective range of the magnetic attraction force to enable the pivotal portions to automatically return the attachment mechanism 124 to the closed position.

While described primarily in the context of eyeglasses with single or double lenses, the magnetic attachment assembly may be used with other types of eyewear, for example goggles or other types of protective eyewear. For example, the magnetic attachment assembly 120 in FIG. 1 may be configured for removably attaching a lens 112 of an eyewear (e.g., a goggle lens) to the eyewear frame 130 (e.g., a goggle frame). As described, the attachment assembly may include an attachment mechanism 124 which is coupled to or forms part of the eyewear frame 130, and a carrier which is coupled to the lens 112. The attachment mechanism 124 may include a first member pivotally coupled to a second member, and the second member may be configured to enable placement of the eyewear 100 in the wearer's field of view. For example, the second member may be coupled to or form part of an eyewear frame 130, which enables the placement of the eyewear 100 in a desired location with respect to the wearer's face. In the case of goggles, the eyewear frame 130 may be shaped as a face mask as is generally known in the art of goggles and may include a compliant (e.g., soft rubber) portion configured to be positioned against the wearer's face. The face mask may define an opening generally corresponding to the shape of the lens 112 or a sub-frame to which the lens 112 may be attached in some cases. The second member or portion of the attachment mechanism 124 may be either rigidly or movably coupled to the frame or form part thereof and the first member or portion may be pivotable to the first member or portion and thus to the frame. In some embodiments, the attachment mechanism 124, for example the second member, may be coupled to a strap connector or directly to a strap of the goggle to enable placement of the goggle in a desired location with respect to the wearer's face. Each of the first and second members of the attachment mechanism 124 may include a magnetic material. The magnetic materials may be arranged on the respective first and second members in a manner to attract the first and second members or portions toward one another (e.g., along a direction of magnetic attraction).

One or more carriers 122 may be attached to the lens 112, for example to opposite (e.g., left and right) ends of a goggle lens. In some embodiments, a single carrier may be used. In other embodiments a plurality (e.g., two or more) carriers may be used. The one or more carriers may be positioned anywhere around the perimeter of the lens (e.g., at the sides, top, bottom, etc.). As described herein, the carrier 122 may be configured to position first and second portions or members of an attachment mechanism 124 on opposite sides of the carrier 122. As described, the carrier may be attached to a removable lens of the eyewear and configured such that the first and second members are positionable on opposite sides of the carrier 122, for example by providing two opposite sides each configured to engage respective one of the first and second members or portions of the attachment mechanism 124. The carrier 122 may define a seat 131 configured to receive one of the members (e.g., the first member) at least partially therein. For example, the seat 131 may be defined by contouring and/or surface features (e.g., one or more walls, channels, and/or through passages) of the carrier, which are designed to position and/or enclose at least part of the first member. The carrier 122 may be configured to prevent movement of another portion of the attachment mechanism (e.g., the second member) in a direction opposite the first direction when the first member is positioned in the seat. For example, the carrier 122 may include contouring and/or surface features (e.g., one or more walls, channels, and/or through passages) on the opposite side of the carrier 122 to prevent movement of the second member away from the first member (e.g., in a direction opposite the direction of magnetic attraction), thus preventing separation of the first and second members when engaged with the carrier.

FIGS. 2-12 show views of eyewear or components thereof in accordance with some embodiments of the present disclosure. The eyewear 200 or any components thereof may include one or more of the features of the eyewear or components described with reference to FIG. 1. Also, eyewear in accordance with the present invention may omit one or more of the features or components illustrated in FIGS. 2-12 or may include additional components or features discussed with reference to illustrated in other figures herein, without departing from the scope of the present invention.

The illustrated example of eyewear 200 in FIGS. 2-8 is a single lens design and includes a lens assembly 210 and an attachment mechanism 224 for coupling the lens assembly 210 to the temples 232. The lens assembly 210 includes a lens 212 and a carrier 222, the carrier 222 forming part of an attachment assembly 220 of the eyewear 200. The attachment assembly 220 also includes the attachment mechanism 224. As described herein, the attachment mechanism 224 may include a first portion 240, which is pivotally coupled to a second portion 250. The first portion 240 may thus be interchangeably referred to as a lever portion 240 or simply lever 240. Each of the first and second portions 240, 250, respectively, may include or be formed at least in part of a magnetic material and may be shaped in any suitable manner to enable engagement with the carrier 222 as described herein. For example, and as further described below, the first and/or second portions 240, 250, respectively, may be implemented using any suitable structures, each of which is positionable on opposite side of the lens. For example, as in the embodiment in FIG. 2, the second portion 250 may be implemented as a plate-like structure that houses or contains magnetic material (e.g., magnet or ferromagnetic metal) and which is configure to be at least partially inserted into the carrier 222. The second portion 250 may thus be interchangeably referred to as a backing or tab portion 250 or simply backing or tab. A tab may be generally rectangular in shape as in the illustrated embodiment in FIG. 2. In other embodiments, the plate-like structure or tab may be rounded for example at its forward end (e.g., a tab having a generally semi-circular or semi-ovular shape). Although the tab is described generally as plate like, this does not imply that the tab is necessarily of constant thickness. While the tab may have a constant thickness in some embodiments, in other embodiments, shaping of the tab's rearward side for example may result in a plate-like structure with varying thickness along its span. Also, it will be understood that the tab need not have a perimeter that defines a regular shape. The perimeter of the tab may define any irregular shape as may be suitable for a particular application. The first and second portions 240 and 250, respectively, may be differently shaped in other embodiments than the examples specifically illustrated or described.

Figure 2:
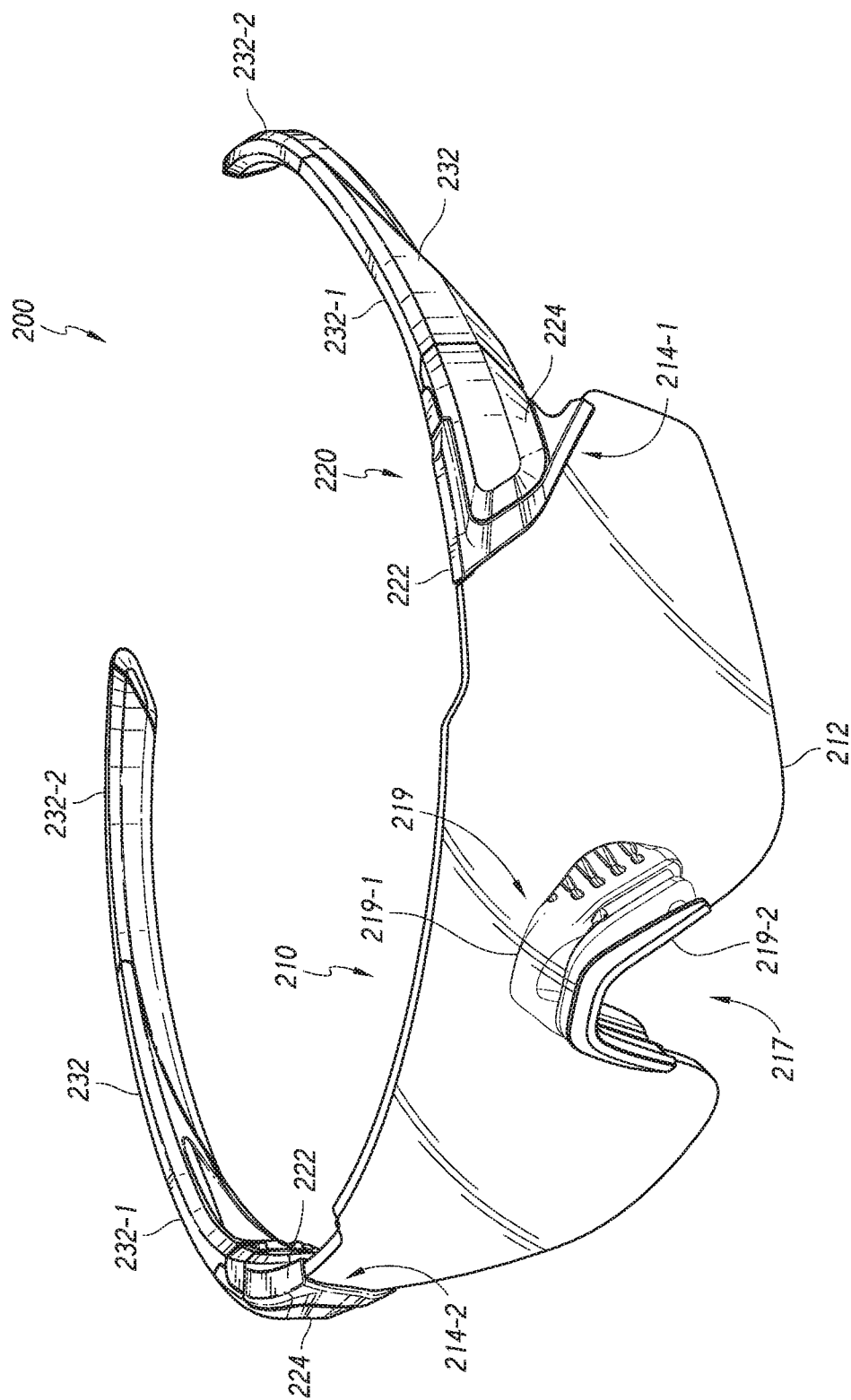
FIG. 2 is an isometric view of an eyewear in accordance with some examples of the present disclosure.

In the illustrated embodiment in FIG. 2, each of the temples 232 is individually removably coupled to a unitary lens 212. In other embodiments, the temples may instead be part of a frame to which one or more lenses may be removably attachable, for example, as described further below with reference to FIGS. 13-18. In some embodiments, such as the embodiment illustrated in FIG. 2, each of the temples 232 is pivotally coupled to the attachment mechanism 224 and thus to the lens assembly 210. In the illustrated embodiment, one or more components of the attachment mechanism 224 is pivotally coupled to a medial portion 232-1 of each temple 232. In other embodiments, one or more components of the attachment mechanism 224 may be pivotable with respect to the temple and/or frame but the temples may not be pivotable with respect to frame and/or lens assembly. As described, the temples 232 may be formed of any suitable material such as metal, a composite material (e.g., fiber-reinforced or laminated materials), or plastics (e.g., injection moldable plastics) and/or may include portions (e.g., distal portions 232-2 of the temples) that may be coated, wrapped with, or otherwise comprising relatively soft materials (e.g., rubber or other elastomer), for example for user comfort.

The lens assembly 210 may include a lens 212 having first and second opposite end portions 214-1, 214-2. The lens 212 may include one or more of the features of lens 112 and may be used to implement lens 112. The lens 212 may have a generally arcuate shape with an arc length direction, e.g., as shown by arrows 215, extending generally along the curvature of the lens (see e.g., FIG. 5A). The lens 212 may be a prescription lens or a non-prescription lens (i.e., a plano lens) and may comprise one or more compounds and/or coatings configured to impart light transmittance characteristics as may be desired or suitable for a particular application. For example, the lens 212 may include one or more compounds or coatings which configure the lens into a tinted lens, a polarized lens, a scratch resistant lens, or combinations thereof. Additionally or alternatively, the lens 212 may be formed from a projectile- or shatter-resistant material selected to meet one or more ballistic safety standards. The lens 212 may have a front or forward-facing side 216 (i.e. the side of the lens which is farthest away from the user's face when the eyewear is worn) and a rear or inward-facing side 218 (i.e. the side of the lens which is closest to the user's face when the eyewear is worn). Compounds and/or coatings, such as for tinting the lens, may be laminated in the body of the lens and/or applied to either of the rear of front sides of the lens 212.

The lens assembly 210 may include first and second carriers 222, each of which is coupled to a respective one of the end portions 214-1, 214-2. Each of the carriers 222 may be an injection molded plastic component, which may be attached (e.g., bonded and/or mechanically secured) to the lens 212. In some examples, the carrier(s) may be attached to the lens while forming the carrier(s) such as through an over-molding process. The carriers 222 may have one or more of the features of the carrier 122 and may be used to implement the carrier 122. In the illustrated embodiment, the lens assembly 210 includes two separate carriers 222 attached to the opposite ends (e.g., distal ends) of the lens 212. The illustrated embodiment of eyewear 200 is generally rimless or frameless in that a perimeter of the lens is not substantially enclosed by a frame. That is, each of the carriers 222 may enclose only a portion of a perimeter of the lens 212, for example, less than 20%, or less than 15% of the perimeter of the lens. By having relatively smaller carriers, a larger unobstructed view of the eyewear may be achieved, although in other embodiments, the carriers 222 may extend over a larger portion of the perimeter than 20%. It is envisioned also that in some embodiments, a unitary lens may be enclosed, at least partially, by a rim, which connects or incorporates the carriers. The carriers of such a rimmed design may function in a similar manner as described herein to individually engage respective left and right temples or for coupling a rimmed lens to an eyewear frame that includes the temples.

Figure 3:
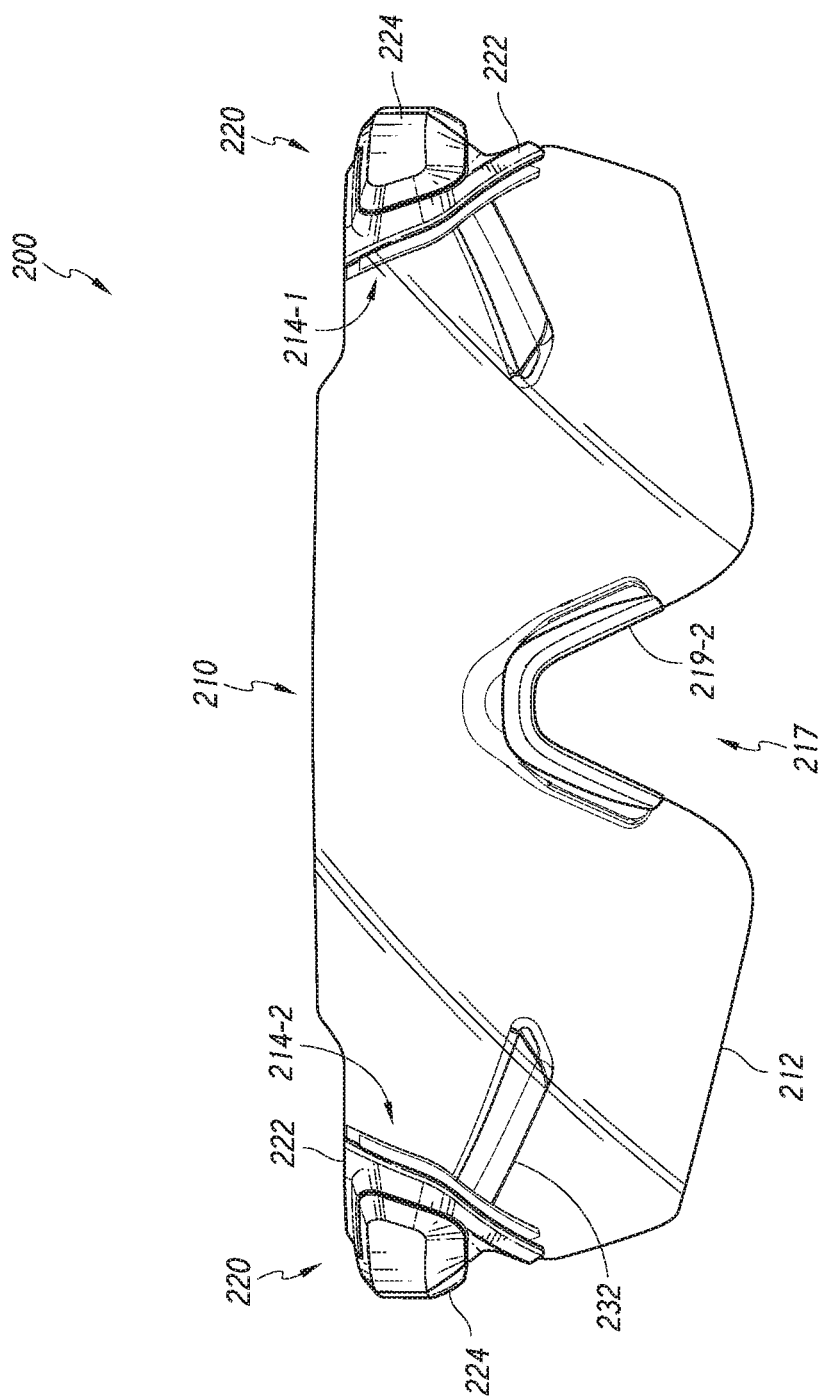
FIG. 3 is a front view of the eyewear of FIG. 2.
Figure 4:
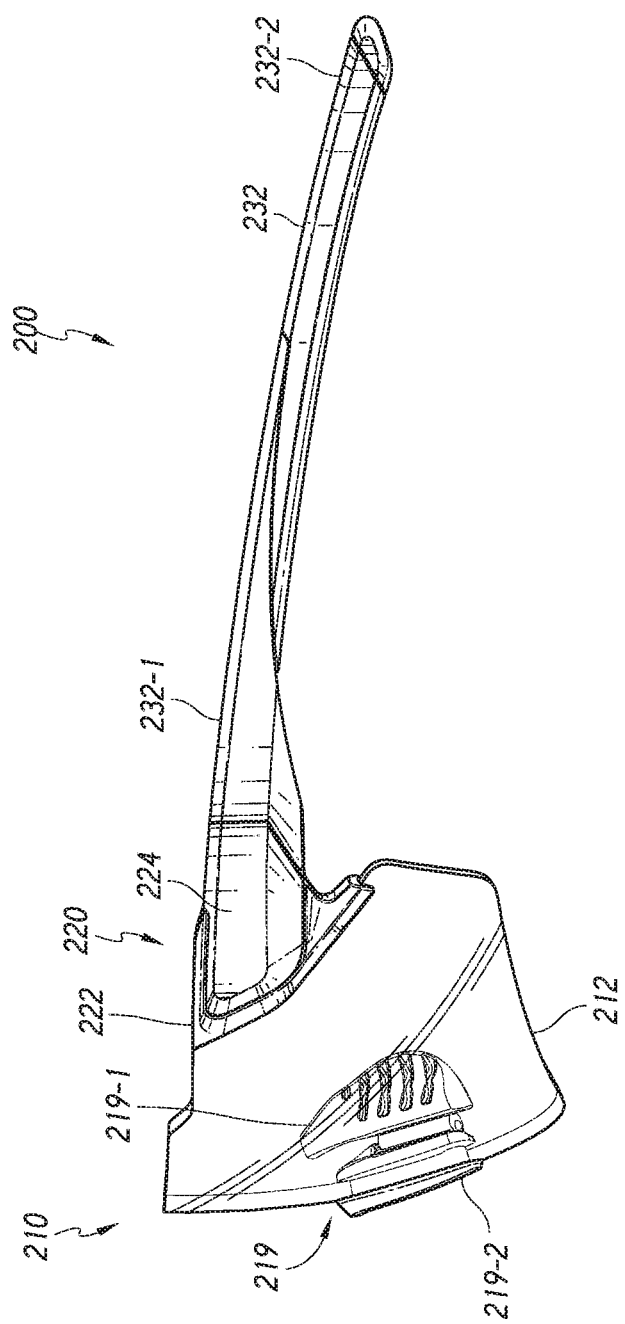
FIG. 4 is a side view of the eyewear of FIG. 2.

The shape of the lens 212 and/or one or more other components or features of the eyewear may serve utilitarian functions, aesthetic functions, or both. In some examples, the upper periphery of the lens may be contoured upward (e.g., as shown in FIG. 3) to increase the surface area of the lens, which may increase the protective (e.g., optical and/or ballistic) function of the lens. For example, by increasing the surface area of the lens, the amount of light penetration, such as in the case of a tinted lens, may be reduced. Alternatively, the contour of the periphery of the lens may be primarily or purely aesthetic. In some examples, the upper periphery may be generally flat across the upper edge or contoured downward (e.g., towards the nose recess) which may provide in a more slender appearance of the lens and/or reduce the weight of the eyewear by reducing the usage of lens material. Other contours or shapes of the lens may be utilized in other examples.

In some embodiments, the lens may define a nose recess 217 (e.g., along a bottom periphery of the lens 212), which may be configured to accommodate the nose of the wearer when the eyewear 200 is worn. In some embodiments, a nose piece assembly 219 may be provided at the nose recess 217. The nose piece assembly 219 may include a nose pad 219-1 and in some cases an optional nose piece 219-2. The nose piece 219-2 may be a generally rigid plastic component (e.g., injection molded plastic) corresponding in shape to the recess 217 and fixedly attached thereto. The nose pad 219-1 may be formed from a soft or flexible polymeric material (e.g., Thermoplastic Elastomer (TPE)) which may conform to the user's nose for a comfortable fit and may optionally include one or more bendable portions for improved adjustability. The nose pad 219-1 may be attached to the nose piece 219-2 or directly to the lens 212 at the recess 217. In some examples, the nose pad 219-1 may be removably attached to the lens 212, such as to enable replacement of the nose pad. In other embodiments, the nose pad 219-1 may not be removable from the lens 212. In some embodiments, the nose piece 219-2 may include one or more retention members 219-3 (e.g., protrusions, clips, hooks, or the like) for coupling the nose pad 219-1 thereto. In some embodiments, the retention members 219-3 may be removably attached to the nose piece or recess and/or may be incorporated in an assembly with the nose pad 219-1. For example, a nose pad assembly may include one or more projections or posts configured to snap into engagement with the nose piece 219-2 or recess 217. In some embodiments, the retention members 219-3 may be adjustable, such as to vary a distance between the retention members 219-3 and thus enable adjustment of the fit of the nose pad 219-1. In the illustrated embodiment, each retention member may be implemented using a projection or post, one end of which is pivotally coupled to the nose piece 219-2 such that distance between the second opposite ends of the retention members may be varied. The nose pad 219-1 may be made from a resilient material (e.g., a material that returns to its original shape in the absence of applied force), and the adjustability of the nose pad 219-1 may be achieved by adjustability of the nose piece 219-2, for example specifically by the adjustability of the retention members 219-3 between one or more positions (e.g., a narrow position in which the second ends of the retention members are closer to one other or a wide position in which the second ends are farther apart from one another). Other combinations may be used for the nose piece assembly 219.

The carriers 222 may be arranged generally along the arc length direction 215 of the lens 212, which may serve aesthetic and/or utilitarian functions. In the embodiment in FIGS. 2-5, each carrier 222 extends from one of two opposite ends of the lens in a direction generally following the curvature of the lens. Carriers arranged as an extension to the lens shape (e.g., as compared to structures that may protrude from surfaces of the lens, for example perpendicularly to the lens) may provide a slimmer form factor, which may be more appealing to the user. In some cases, the lens assembly may be manufactured and/or sold separately from the temples, and this slimmer form factor may enable a more compact packaging of the lens assembly. In the embodiment in FIGS. 2-5, each carrier 222 extends from one of two opposite ends of the lens in a direction generally following the curvature of the lens.

Each carrier 222 may wrap, at least partially, around a front and a rear side of the respective end portion of the lens 212. Each carrier 222 includes a front or forward-facing side 223-1, which is proximate the front or forward-facing side 216 of the lens 212, and a rear or inward-facing side 223-2, which is proximate the rear or inward-facing side 218 of the lens 212. By enclosing part of the front 216 and rear 218 sides of the lens 212, a more secure attachment between the carrier 222 and the lens 212 may be achieved, which may reduce free play and provide a better user experience. As described, e.g., with reference to FIG. 1, the carriers 222 may be formed separately from the lens 212 and may be fixedly assembled thereto, for example by mechanically coupling the carrier 222 to the lens 212, to form the lens assembly 210. The lens 212 may include retention features 213 (see e.g., FIG. 9), which may interlock with cooperating features of the carrier 222. During assembly, the carrier 222 may temporarily elastically deform to allow the retention features 213 to snap into engagement to secure the carrier 222 to the lens 212. In some embodiments, the carrier 222 may additionally or alternatively be glued or otherwise mechanically fastened to the lens 212, e.g., to the respective end portion 214-1 or 214-2.

Each of the carriers 222 may be configured to engage a respective attachment mechanism 224 coupled to respective one of the temples 232 thereby forming the attachment assembly 220. Each carrier 222 may be configured to position one or more portions of the respective attachment mechanism 224 on one side of the lens and one or more portions of the attachment mechanism 224 on the opposite side of the lens, as well as align these portions relative to the carrier 222 and thus the lens assembly 210. For example, each carrier 222 may include engagement features, which may be arranged on the front and/or rear sides of the carrier, as will be further described. For example, the front side 223-1 of the carrier 222 may include features configured to engage with a first portion (e.g., a lever portion) of the attachment mechanism 224 and the rear side 223-2 of the carrier 222 may include features configured to engage with a second portion (e.g., a tab portion) of the attachment mechanism 224 thereby positioning the first and second portions of the attachment mechanism 224 on opposite sides of the lens when the temple 223 is attached thereto. The engagement features may include one or more seats, channels, ramps, apertures, posts, protrusions, walls and/or contouring of surfaces on one or more sides of the carrier. By arranging the carriers 222 as an extension to the curvature of the lens 212 and configuring the attachment mechanisms 224 to engage both the front and rear sides of the lens assembly, an improved connection between the lens and temples may be achieved. The combination of features described herein may allow tighter tolerances to be maintained between the mating components of the eyewear (e.g., between the attachment mechanism and carrier), for example as compared to tolerances that may be achievable by mating features (i.e., holes or notches) cut into the lens itself. The ability to maintain tighter tolerances in accordance with the examples herein may provide a better user experience.

In some embodiments, such as the illustrated embodiment in FIGS. 2-10, a first side (e.g., front side 223-1) of the carrier 222 may define a first channel 225, also referred to as front channel 225. The front channel 225, and in some examples in cooperation with surfaces of the passage 228, may define a seat 231 which may be configured to position and/or align the lever portion 240 with respect to the carrier 222. The seat 231 may be configured to receive the lever portion 240 at least partially therein. The seat 231 may be configured to accommodate the received portion in a close fit therein, with some or all surfaces of the received portion being design to abut the surfaces of the seat 231. It will be understood however, that in some embodiments, one or more surfaces of the received portion may not contact the seat 231. By increasing the amount of surfaces that contact one another, more precise tolerances may need to be maintained during manufacture; however, a greater amount of contacting surfaces may improve overall fit between the temple and lens assembly thus providing a better user experience. It will be further appreciated that although certain advantages or benefits are discussed with reference to some of the embodiments herein, some embodiments of the present disclosure may not provide all or any of these advantages or benefits.

As illustrated, the channel 225 may be generally aligned with the arc length direction (e.g., the direction of curvature) of the lens and may thus function to align the temples with the direction of curvature of the lens. The direction of curvature in the context herein generally refers to the curvature of the lens in the horizontal plane, although it will be appreciated that in some examples, the lens 210 may also be curved in the vertical plane. Additionally or optionally, the shape of the passage may provide the positioning and/or alignment function. For example, the passage may be rectangular, triangular or otherwise shaped to force the lever portion 240 in a particular position or orientation for proper coupling with the carrier.

The front channel 225 may include one or more walls that restrict movement of the lever portion 240 in one or more directions. For example, the channel 225 may be configured to restrict lateral movement of the lever portion (e.g., in a direction generally perpendicular to the directions 215 and 217), forward movement of the lever portion (e.g., generally towards the medial portion of the lens along direction 215), or combinations thereof. The one or more walls may include an upper wall 225-1, which may restrict upward movement of the lever portion 240 (e.g., movement toward the upper peripheral edge of the lens 212). The one or more walls may include a lower wall 225-2, which may restrict downward movement of the lever portion (e.g., movement toward the lower peripheral edge of the lens 212). As such, the upper and lower walls of the channel 225 may restrict movement of the lever portion 240 generally laterally to the arc length direction 215 of the lens 212. In some embodiments, the one or more walls may include a forward wall 225-3, which may restrict forward movement of the lever portion (e.g., movement toward a medial or central portion of the lens 212). In some embodiments, forward and/or lateral movement of the attachment mechanism may alternatively or additionally be restricted by other engagement features of the carrier such as the post 227 and/or features provided on the opposite side of the carrier (i.e., walls 226-1, 226-3, 226-3), as described further below. The channel walls (e.g., 225-1, 225-2, and 225-3) may be contoured outwardly towards the perimeter of the carrier as may be desired, for example to provide an aesthetically pleasing look to the eyewear.

In some embodiments, the front side 223-1 of the carrier 222 may not include a channel. In such embodiments, positioning and/or alignment of the lever portion 240 relative to the carrier 222 may be achieved substantially by the shape and/or contours of the seat 231, which in the illustrated embodiment is defined in part by the shape and wall contours of the passage 228. Additionally or alternatively, positioning and/or alignment of the lever portion 240 may be aided by the automatic centering of the magnets in embodiments in which a pair of magnets is used at each of the attachment mechanism 224. In other embodiments, the front side 223-1 may include a channel 223 but walls of the channel 223 may serve primarily an aesthetic function and positioning and/or alignment may be provided by other features of the attachment assembly 220.

In some embodiments, such as the illustrated embodiment in FIGS. 2-10, the second side (e.g., rear side 223-2) of the carrier 222 may define a second channel 226, also referred to as rear channel 226. The rear channel 226 may be may be configured to position and/or align the tab portion 250 with respect to the carrier 222. Similar to the front channel 225, the rear channel 226 may be generally aligned with the arc length direction 215 (i.e., direction of horizontal curvature) of the lens 212, thus also facilitating the alignment of the temples 232 with the direction of curvature of the lens 212. The rear channel 226 may include one or more walls that restrict movement of the tab portion 250 in one or more directions. For example, the rear channel 226 may include an upper wall 226-1, which may restrict upward movement of the tab portion 250, a lower wall 226-2, which may restrict downward movement of the tab portion 250, and a forward wall 226-3, which may restrict forward movement of the tab portion 250. Like the front channel, the walls of the rear channel 226 (e.g., 226-1, 226-2, and 22-3) may be contoured outwardly towards the perimeter of the carrier, as may be desired, which may provide utilitarian functions (e.g., ease of manufacture) and/or aesthetic functions.

In preferred embodiments, the rear channel 226 may be configured to restrict movement of the tab portion 250 in a direction 217 opposite the direction of magnetic attraction. The direction 217 may be generally perpendicular to and away from the rear side of the carrier 222, when the temple 232 is coupled thereto. For example, the rear channel 226 may be configured to at least partially enclose the tab portion 250. One or more of the walls (e.g., the upper, lower, and/or forward walls 226-1, 226-2, and 262-3) may have portions (e.g., flanges 226-1a, 226-2a, 226-3a) that extend over the rearward facing side of the tab portion 250 thereby restricting movement of the tab portion 250 along the direction 217. The flanges 226-1a, 226-2a, 226-3a may cooperate with ledges (258-1, 258-2, and 258-3) formed in the rearward facing side of the tab portion 250 to restrict the rearward movement of the tab portion, while still providing an aesthetically pleasing (e.g., smoothly contoured) look of the assembled eyewear. In some examples, interior sides of the one or more of the walls may be shaped (e.g., angled) in a manner to retain the tab portion therein, for example by forming a dove-tail slidable joint with the tab portion. By restricting movement (e.g., forward and/or lateral movement) of the tab and/or lever portions, and thus movement of the attachment mechanism in relation to the lens assembly, the attachment assembly may be configured to resist certain forces. For example, if a stretching force is applied at the distal portion of the temples, e.g., along the direction 209, which may occur for example if a user attempts to spread the temples wider than the nominal distance between the temple in the as-worn configuration (e.g., when placing the eyewear on a helmet for example or about any other circumference that is greater than the nominal circumference), the attachment mechanism may experience a reaction force acting against the magnetic force of attraction between the tab and lever portions, this reaction force tending to push the tab portions away from the lever portions. In the absence of engagement features as described herein (e.g., channel 226), the magnetic force may be insufficient to maintain the tab and lever portions in the closed position and the temples may pop off or disengage, which would be undesirable. Using magnets that provide a sufficiently strong magnetic field to resist this reaction force may not be a practical solution because this would make coupling or decoupling of the temples by the user more arduous (e.g., the user would have to apply significantly more force to open the lever portions), thus detracting from the user experience. Thus the novel combination of using mechanical and magnetic retention to maintain the attachment mechanism in engagement with the carrier in accordance with the examples herein may provide a more elegant solution.

Figure 5A:
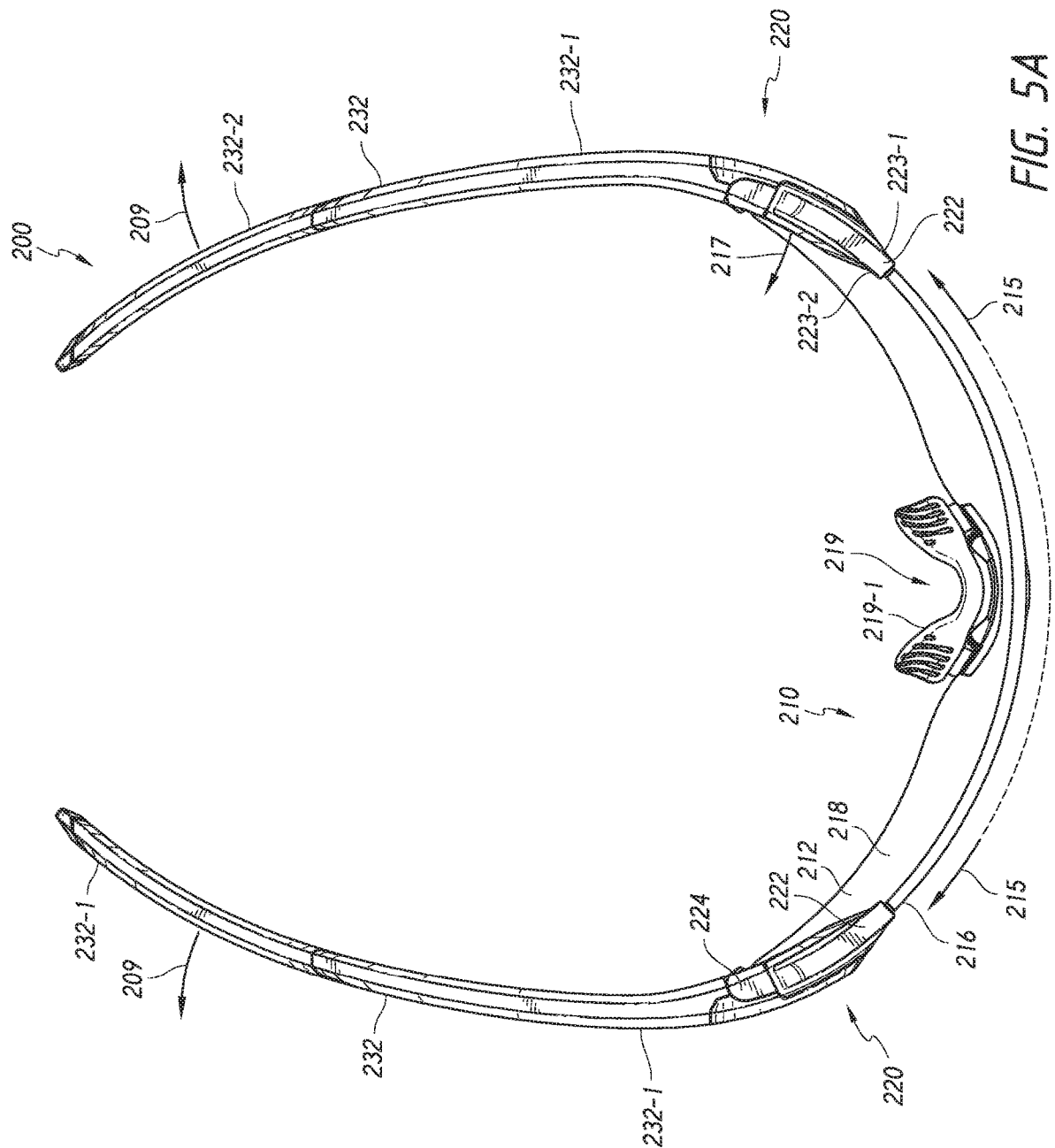
FIG. 5A is a top view of the eyewear of FIG. 2.
Figure 5C:
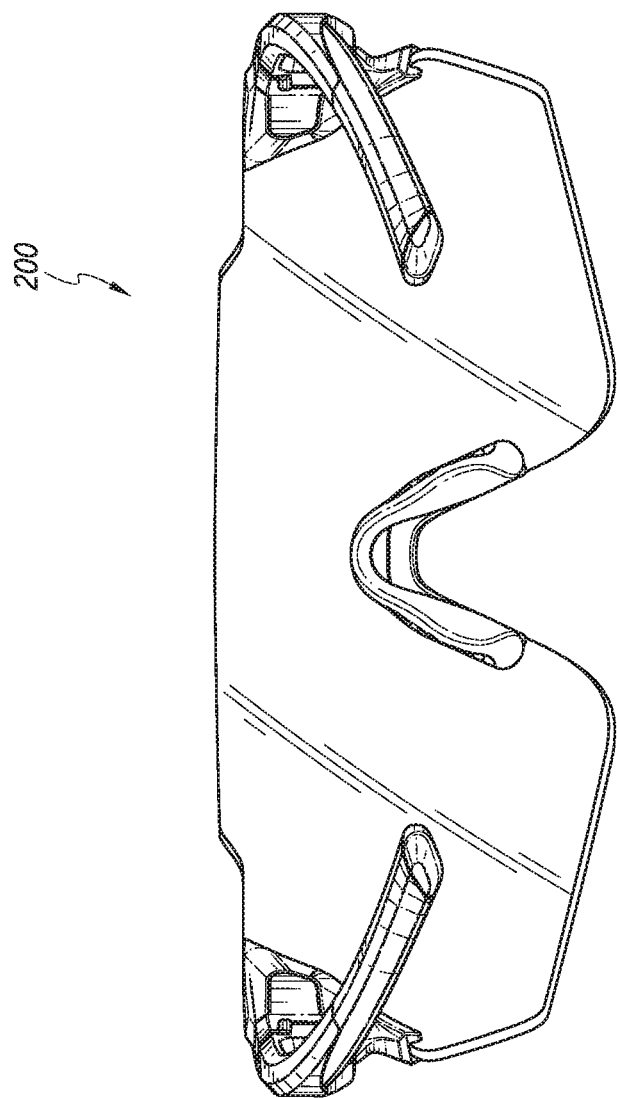
Figure 6:
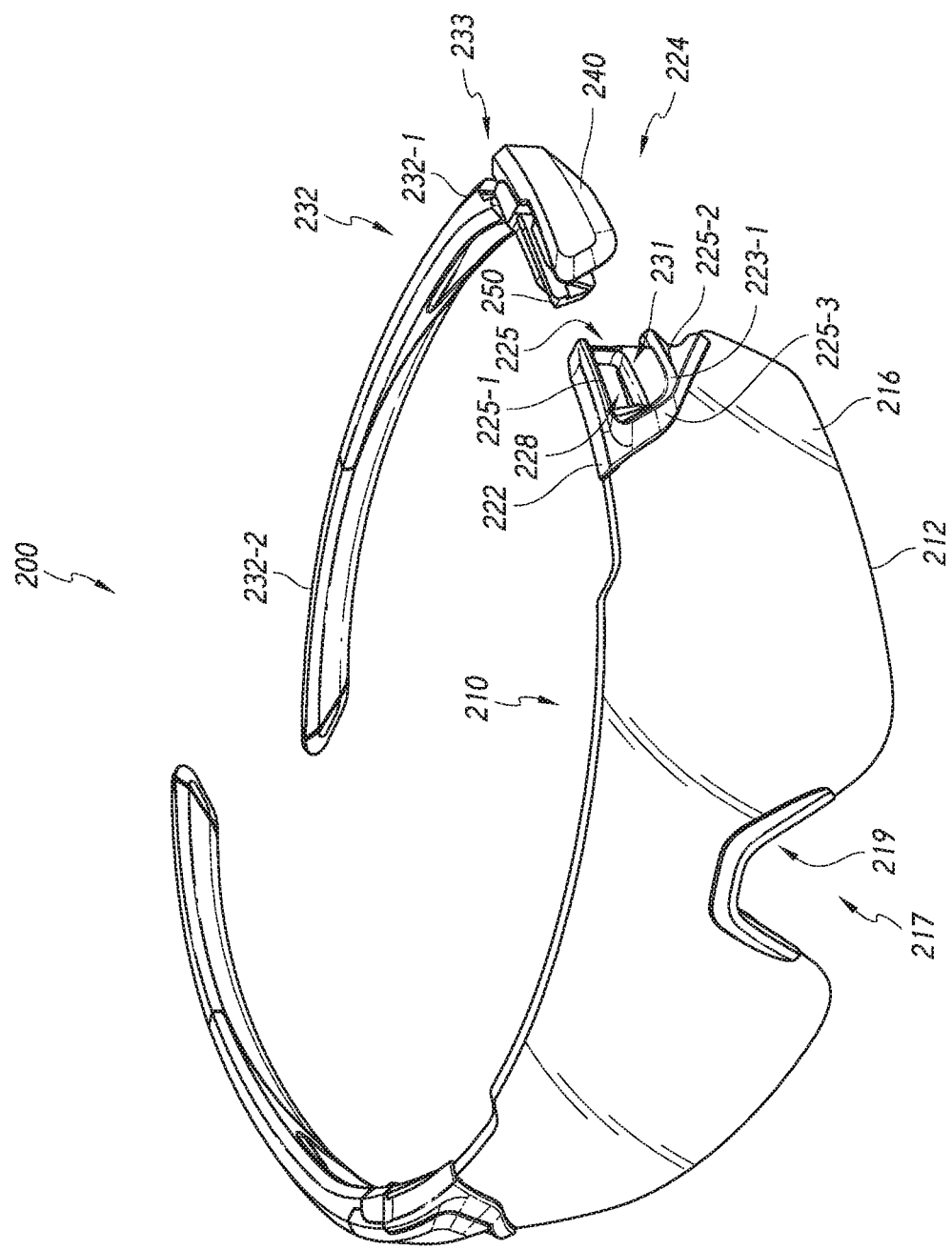
FIG. 6 is an isometric view of the eyewear of FIG. 2 with one of the temples removed from the lens assembly.
Figure 7:
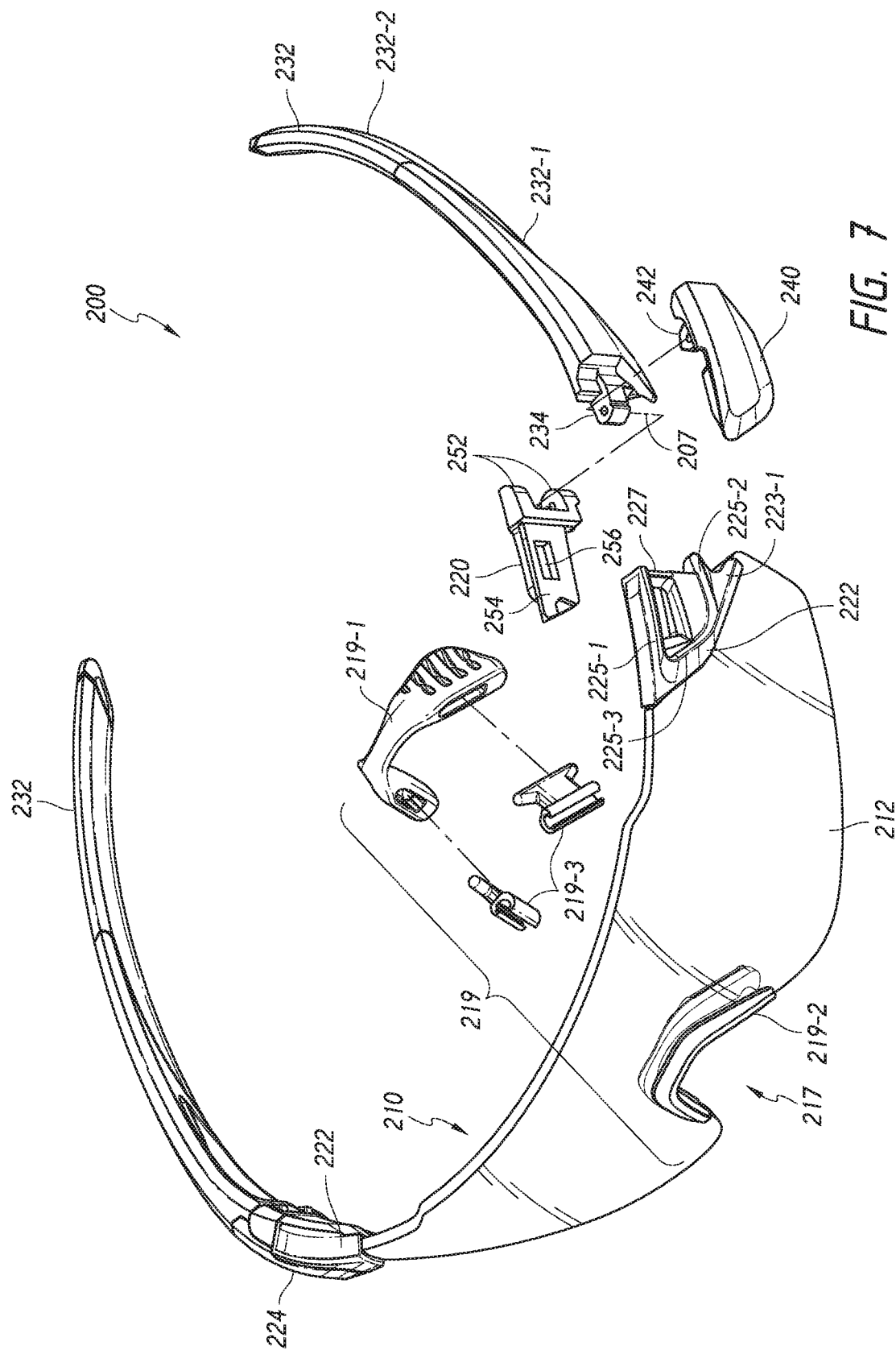
FIG. 7 is a partially exploded isometric view of the eyewear of FIG. 6.
Figure 10:
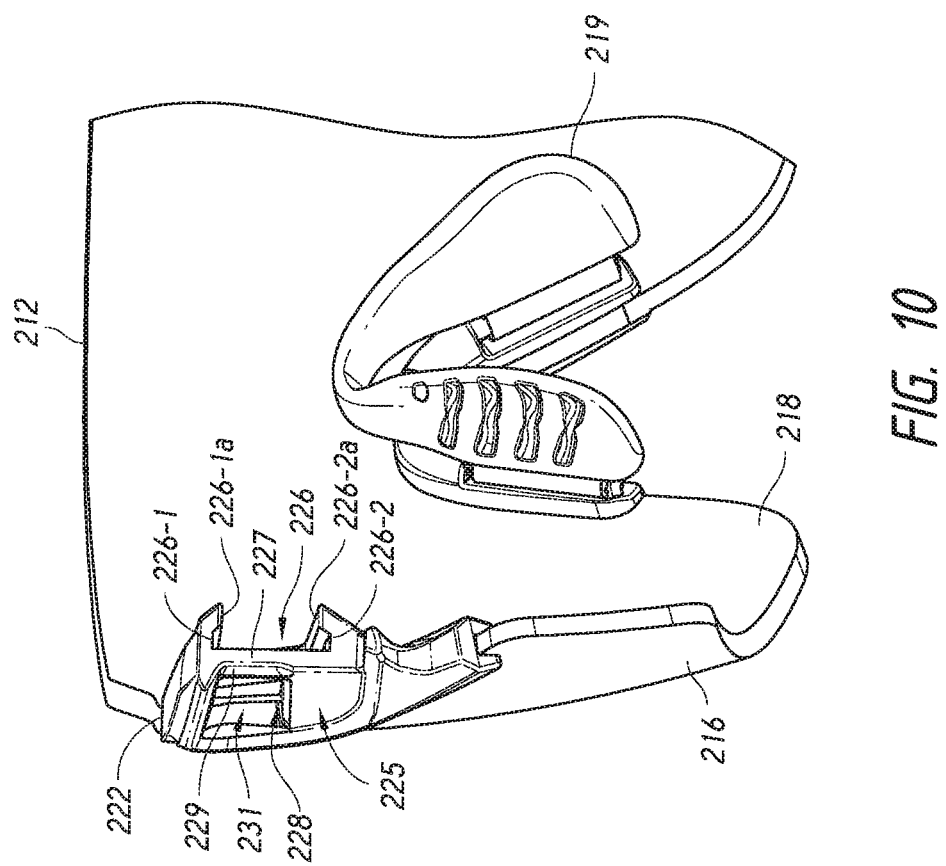
FIG. 10 is another partial view of a lens assembly according to the present disclosure.

As described, the attachment mechanism 224 may include a lever portion 240 and a tab portion 250 pivotally coupled to the lever portion 240. In the illustrated embodiment, the lever portion 240 is pivotally coupled to other parts of the attachment mechanism 224 (e.g., to the tab portion 250) to allow the lever portion to pivot away from the tab portion 250 while sliding the tab portion into and out of the channel 226 during coupling and decoupling of the temple to the lens. In other embodiments, position of the two may be reversed, for example the rear portion may pivot away from the lens while the front portion is slid into and out of a retaining channel. In some embodiments, the attachment mechanism 224 may be pivotally coupled to the respective temple, such that when the lens is installed into eyewear 200, the temples are pivotable between a folded configuration and an as-worn configuration (e.g., as shown in FIG. 5A). In the as-worn configuration (see FIG. 5A), the temples may be unfolded to the position shown in FIG. 5A and in the folded configuration the temples may be folded towards one another, e.g., in a direction opposite direction 209 in FIG. 5A. In the as-worn configuration, the temples may prevent separation of the lens from the eyewear. For example, a lever end of the portion 240 may engage (e.g., abut) a surface of the temple to prevent pivoting of the lever portion to its open position. Thus, by mechanically locking out the lever, this arrangement may advantageously ensure that the lens cannot accidentally be detached from the eyewear when the eyewear is being worn. In other embodiments, it is envisioned that the temples may not lock out the lever in this manner. For example, the lever may be pivoted to the temple through a slot cut into the temple. This may allow the lever to open even with the temples in the as-worn configuration. This type of arrangement may be advantageous for embodiments in which the temples are not pivotally attached to the lens assembly. In some embodiments, e.g., as illustrated in FIGS. 7 and 8, the lever and tab portions are pivotally attached to one another at the temple hinge 233, thus sharing a common pivot axis 207 (also referred to as hinge axis) with the temple 232. The lever and tab portions 240 and 250, respectively, may each include a hinge part 242 and 252, respectively, which together with the hinge part 234 of the temple 232 may form the temple hinge 233. In yet further embodiments, the tab and lever portions need not share a pivot axis with the temple hinge and may for example be medially located from the temple hinge.

The hinge parts 242 of the lever portion may incorporate a stop feature 245. Typically, a hinge part of a conventional hinge is rounded on all free sides (e.g., as shown by dashed line 245c in FIG. 12B) in to allow the hinge to rotate freely about the hinge axis. In the illustrated embodiment, one or more of the hinge parts 242 may be shaped to include a flattened projection 245a, which may act as a hard stop of the hinge part 242 to limit the amount of rotation of the hinge part 242. When the lever portion 240 is pivoted toward the open position, a surface of the flattened projection 245a abuts a distal surface of the tab portion 250 to limit the separation between the lever portion 240 and the tab portion 250. In some embodiments, the pivotal angle is thus limited to up to 20 degrees, up to 25 degrees, or up to 30 degrees as may be dictated by the design of the mating components. For example, the pivotal angle may be limited to an amount sufficient to allow the lever portion 240 to pass over the distal end of the carrier (e.g., during separation of the temple from the lens) while still remaining close enough to the tab portion 250 to be within the field of magnetic attraction created by the magnetic materials 261-1 and 261-2. By maintaining the lever portion 240 within the range of the field during separation, the lever portion 240 is able to automatically snap back to the closed position without the application of user force. In other embodiments the stop feature may be implemented in a different manner, for example by spring loading the lever portion or using a different combination of structural elements to limit the pivotal movement of the lever portion.

A magnetic material is affixed to each of the lever portion 240 and the tab portion 250. In some embodiments, the magnetic material on each of the lever portion and the tab portion may be a magnet (e.g., a neodymium or other type of permanent magnet). In other embodiments, the magnetic material on one of the lever and tab portions may be a magnet and the other may be a ferromagnetic material. The magnetic materials (e.g., 261-1 and 262-2) are arranged on opposing sides of the lever and tab portions (e.g., engagement sides 244 and 254 of the tab and lever portions, respectively) to urge the lever and tab portions in a first direction towards one another, which direction may also referred to as the direction of magnetic attraction.

Each of the lever portion 240 and the tab portion 250 may include a housing to secure the magnetic material thereto. For example, a magnet housing 246 (see e.g., exploded views 7 and 8, in which the magnetic materials have been removed to illustrate features of the magnet housings) may be provided on the engagement side 244 of the lever portion 240. The magnet housing 246 may protrude from a surface of the engagement side 244 and may at least partially enclose the first magnetic material 262-1, for example, by surrounding all but one side of the first magnetic material. Similarly, a magnet housing 256 may be provided on the engagement side 254 of the tab portion 250. The magnet housing 256 may be provided by a recess defined in a surface of the engagement side 252. The recess may at least partially enclose the second magnetic material 262-2, for example, by surrounding all but one side of the second magnetic material. The second magnetic material 262-2 may be seated in the magnet housing 256 such that it does not protrude above the surface of the engagement side 254, thus allowing the tab portion 250 to slide unobstructed within the rear channel 226. The engagement side 254 may be substantially flat and the magnetic material may be substantially flush or slightly below the surface of the engagement side, such as to allow the tab portion 250 to slide into and out of the channel 226. The magnetic materials 261-1 and 261-2, which in some cases may be a pair of magnets or a magnet and a piece ferromagnetic material, may be attached to the respective lever or tab portion, for example by being press fit into the respective magnetic housing. Additionally or alternatively, the magnetic materials may be bonded to the housing and/or one or more retaining features, such as a lip at the opening of the housing or surface features on the inside of the magnet housing, may be used to secure the magnetic materials thereto. In other embodiments, the magnetic materials may be attached to their respective housing during the molding of the respective component of the attachment mechanism 224. In some embodiments, the facing sides of the magnets may be partially or fully enclosed by a surface which may enhance the mechanical retention of the magnets to the respective one of the tab and lever portions. That is, one or both of the magnets may be inserted into a slot defined by the respective tab or lever portion, such as by being inserted in a direction not in line with the magnetic force. In such examples, the magnets may attract through the material of the tab and/or lever portions (e.g., a thin wall on the engagement side of the magnet housing where the magnetic force may act through these thin walls). This arrangement may provide a robust mechanical assembly between the magnets and the respective tab or lever portion.

Figure 12B:
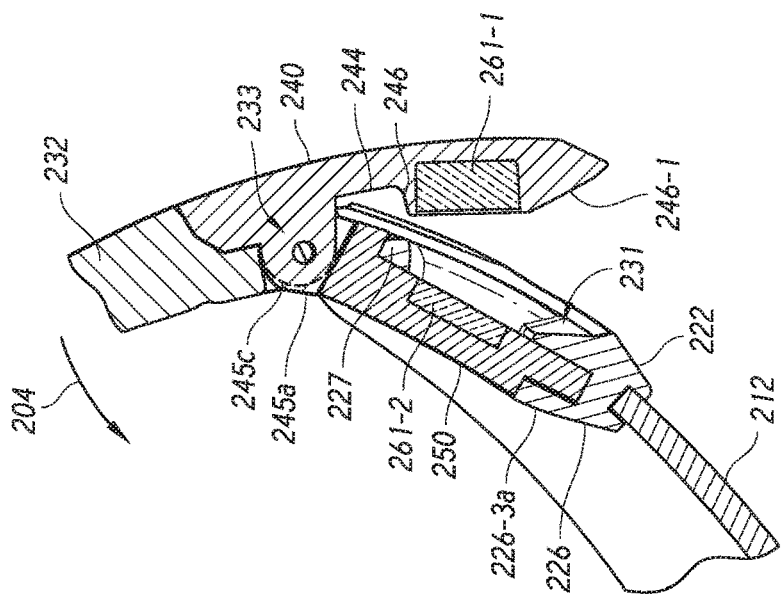
FIGS. 12A and 12B are cross-sectional partial views of an eyewear in accordance with the present disclosure.
Figure 12A:
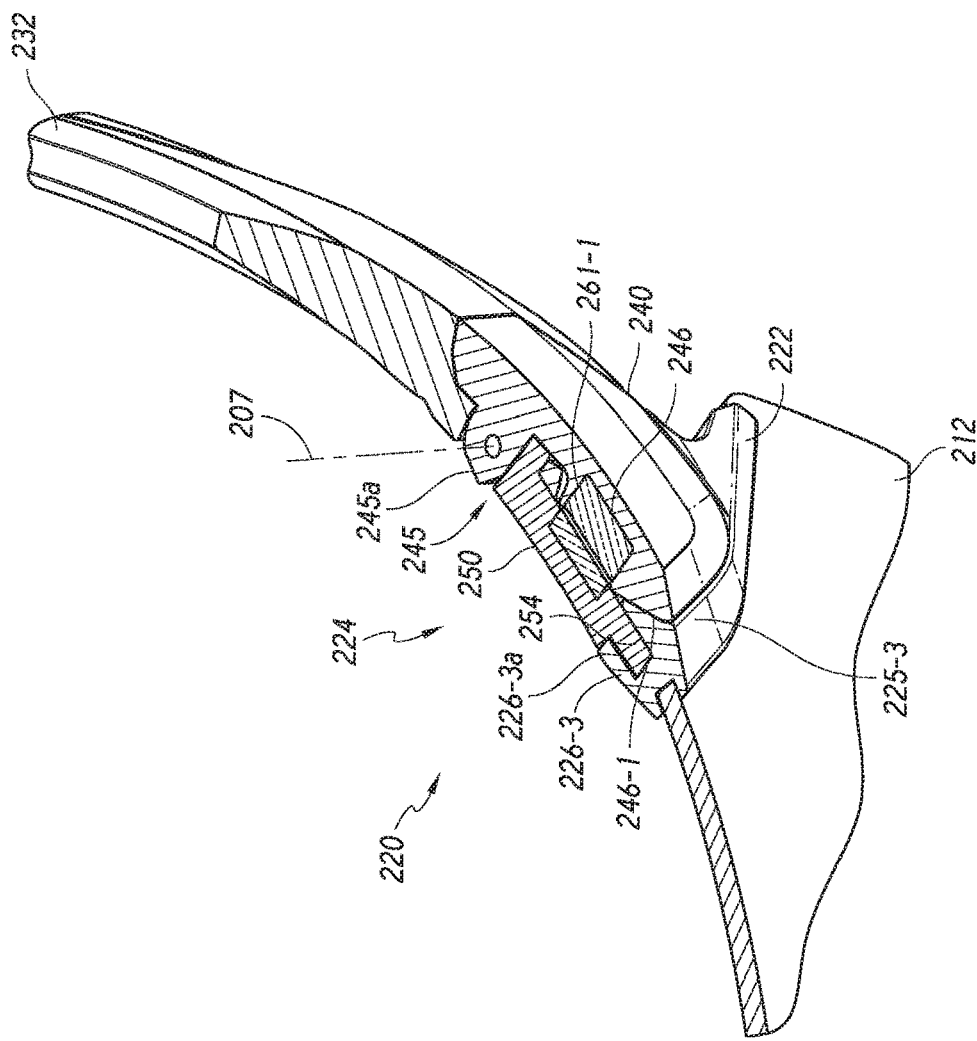
Figure 13A:
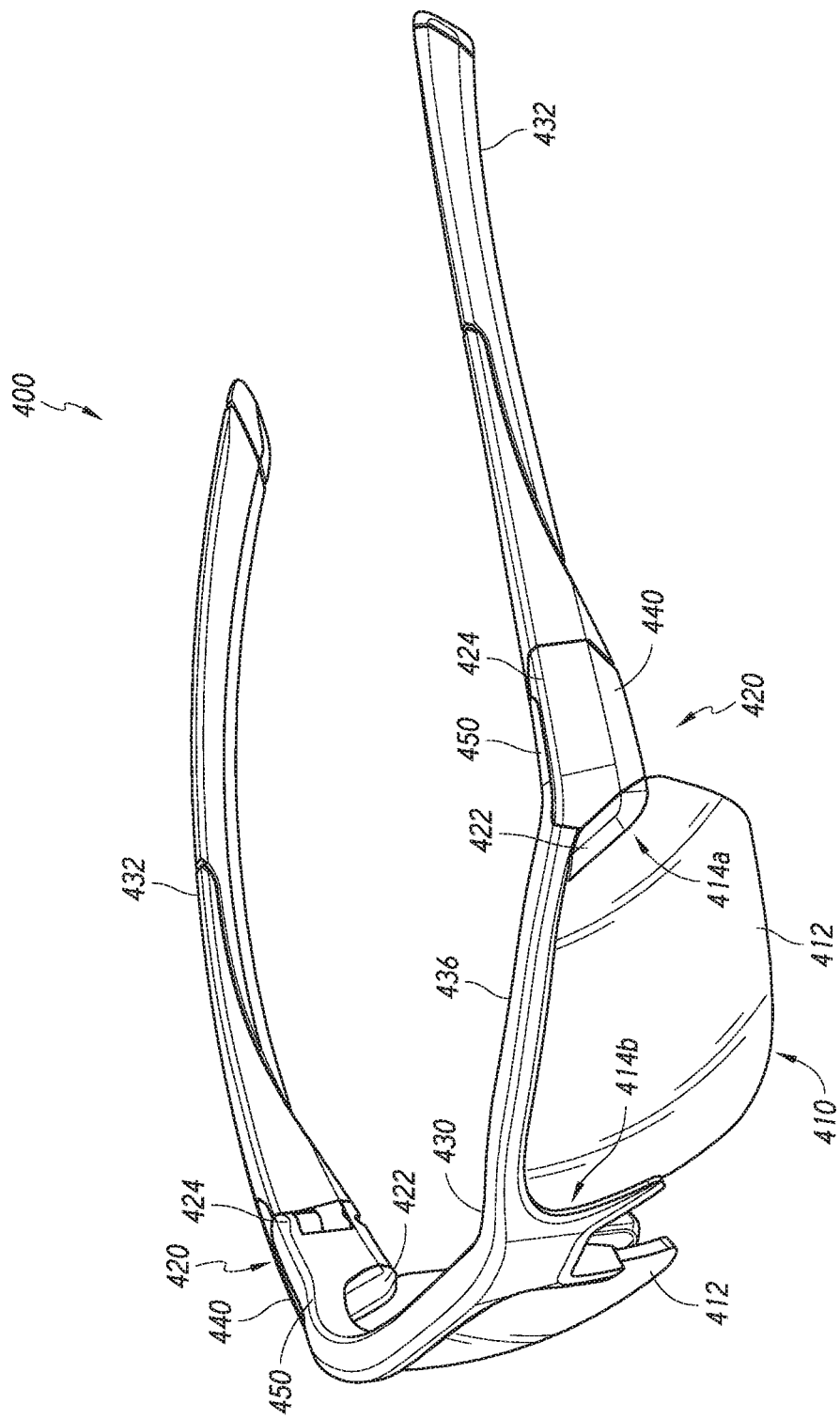
FIG. 13A is an isometric view of an eyewear in accordance with another embodiment of the present disclosure.
Figure 13B:
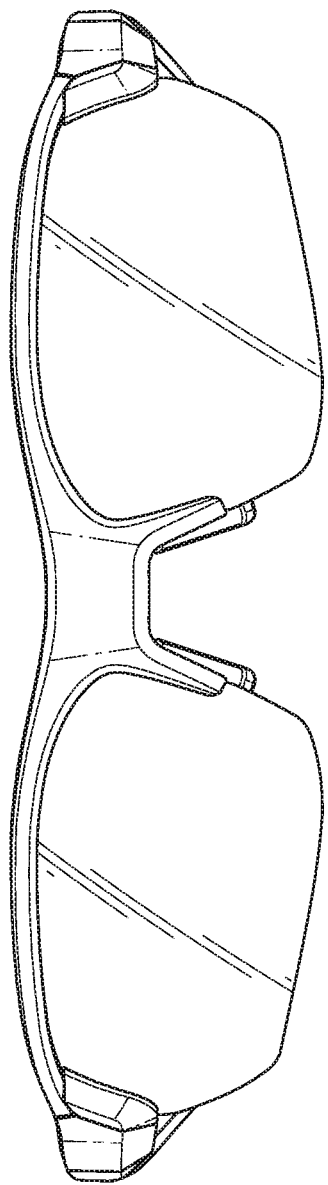
Figure 13C:
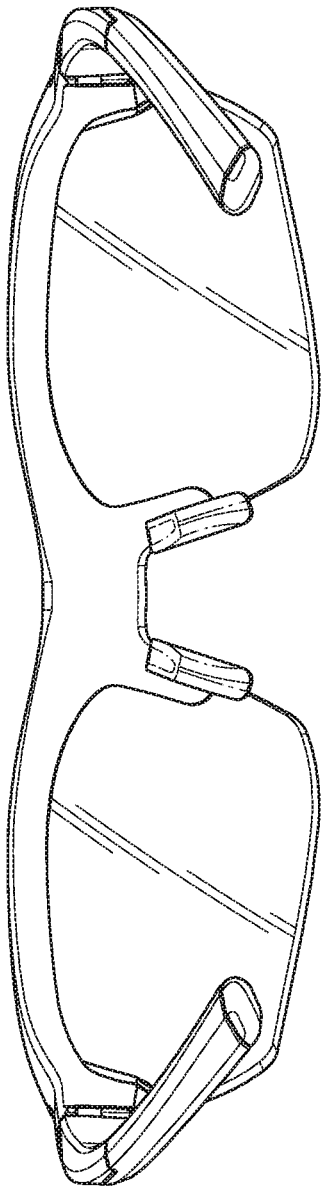
Figure 13D:
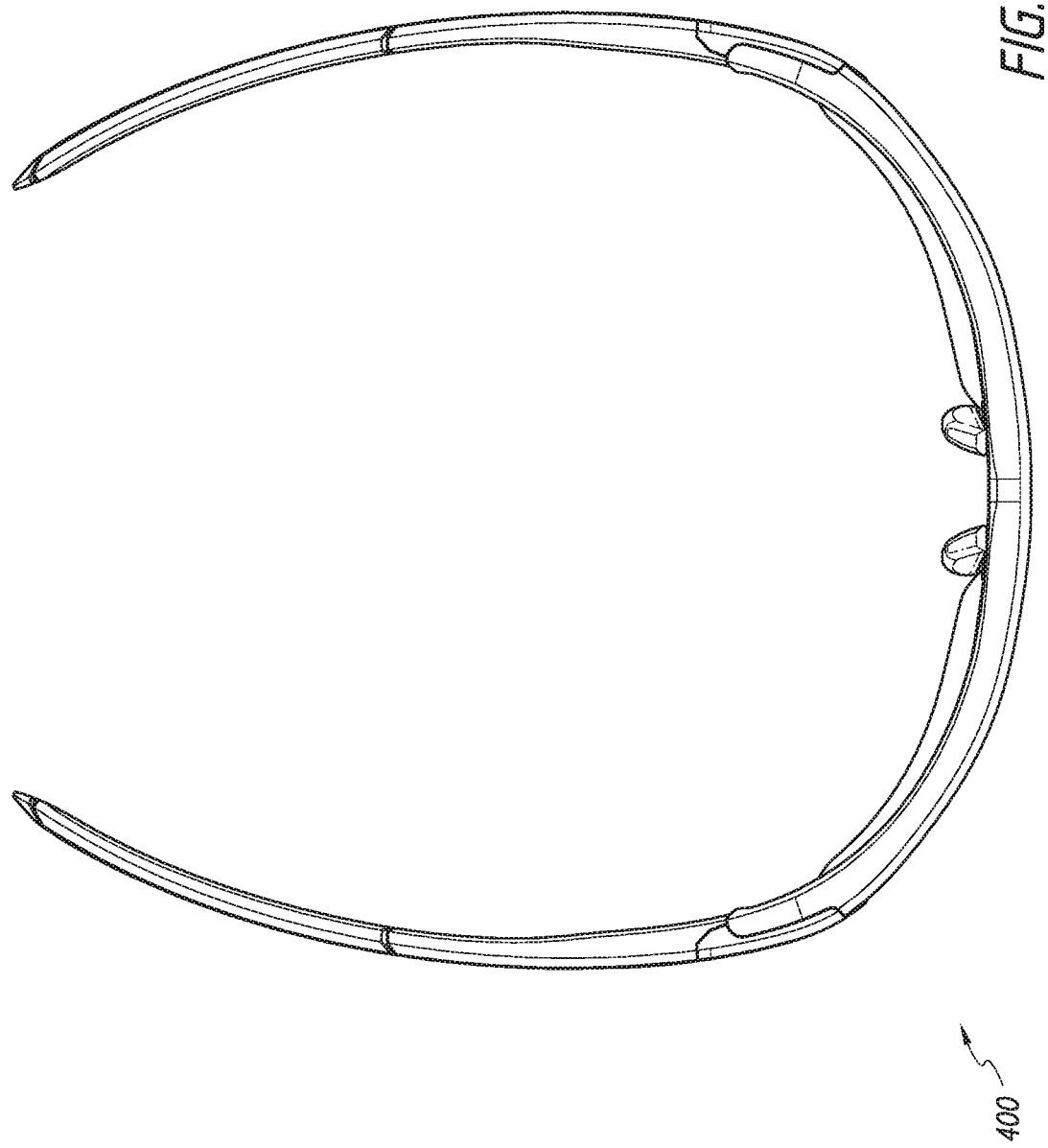
Figure 13F:
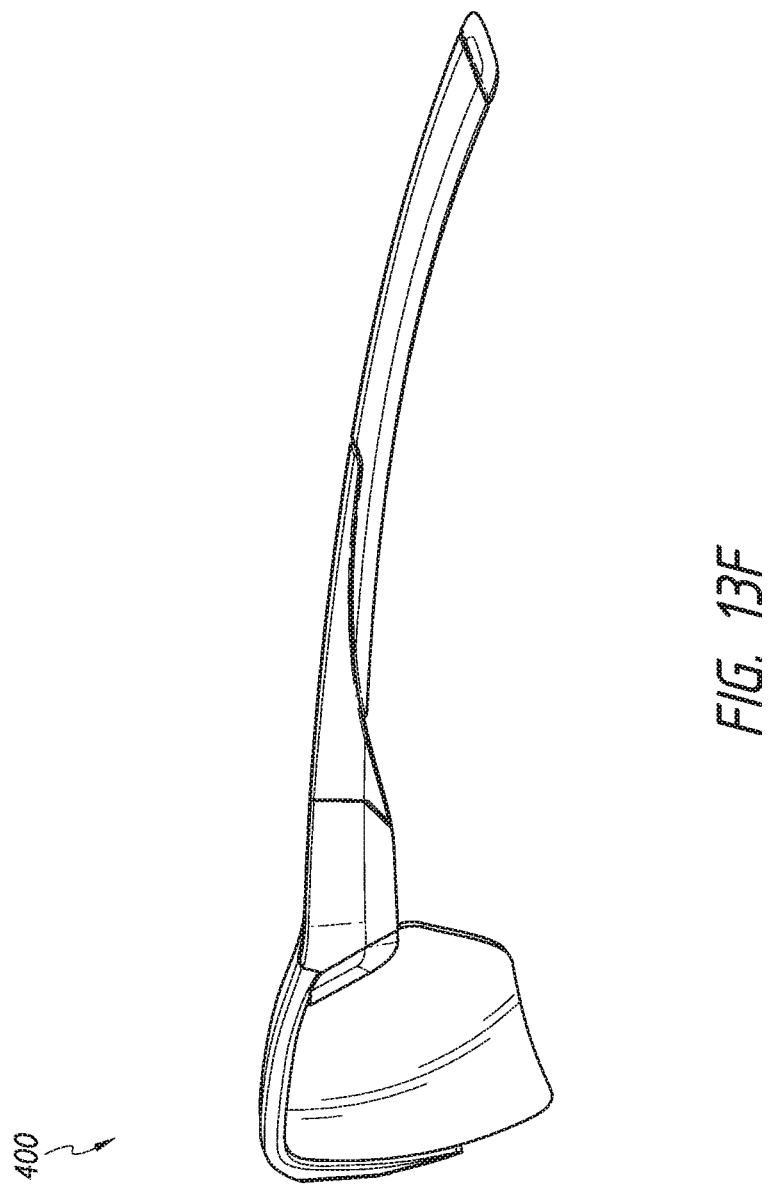

As described, the carrier 222 may include a seat 231 configured to position the lever portion 240. The seat 231 may be defined at least partially by surface contours at the base of the channel 225. The seat may have a shape corresponding to the shape of the magnet housing 246 such as to enable a close fit with the magnet housing 246 when pulled towards the tab portion under the magnetic attraction force of the magnetic materials 262-1 and 262-2. In some embodiments, the seat 231 may be defined, at least partially by walls of a passage 228, which connects the front and rear sides of the carrier 222. In embodiments which include a passage 228, the lever portion 240 may be configured such that at least part of the lever portion 240, for example the magnet housing 264 or a portion thereof, is received in the passage 228 and thus passes through a portion of the carrier 222, e.g., as shown in FIG. 12A.

In some embodiments which include a passage 228, the attachment assembly 220 may be configured to allow the magnetic materials to contact when the attachment mechanism 224 and thus temple 232 is coupled to the carrier 222 and thus to the lens assembly 210. In other embodiments, the attachment assembly 220 may be configured such that the magnetic materials do not contact one another when the temple 232 is coupled to the lens assembly 210. For example, in embodiments, which include a passage 228, the depth of the passage 228 may be slightly greater than the height of the magnet housing 246 thus providing the first magnetic material 262-1 a slight distance away from the second magnetic material 262-2 when the attachment mechanism is engaged to the carrier. In other embodiments, one or more of the magnetic materials may be seated slightly below the upper most edge of the respective magnet housing thus the magnetic materials may not come into contact with one another even if the attachment assembly 220 is arranged to allow the lever and tab portions to contact one another when engaged through the carrier. In yet further embodiments, the carrier may not include a through passage 228 and the seat may bottom out at a thinned out portion of the carrier with the magnetic attraction between the materials 262-1 and 262-2 acting through the thinned out portion of the carrier to secure the attachment mechanism to the carrier. In some embodiments, the seat may be defined solely by the walls of the channel without additional contouring or shaping of the surface(s) at the base of the channel. In such embodiments, the magnetic materials 262-1 and 262-2 may be separated by a small gap in the engaged or closed position of the attachment mechanism.

As described, the seat 231, which may be defined in part by a channel 225 and/or a passage 228, may function to align the lever portion 240 with respect to the carrier 222 and thus with respect to the lens 212. Similarly, the channel 226 may facilitate alignment of the tab portion 250 with respect to the carrier 222 while also preventing separation of the tab portion 250 from the carrier 222 in a direction opposite the force of magnetic attraction. In some embodiments, the forward wall of the magnet housing may taper downward towards a forward end of the lever portion defining a ramp 246-1. The ramp 246-1 may be inclined such that the thickness of the lever portion 240 increased from the forward end of the door toward the magnetic material. The ramp 246-1 may cooperate with a ramp on the carrier 222 to facilitate the automatic opening of the attachment mechanism 224, as further described. The ramps may bear against each other as the attachment mechanism 224 is advanced in the insertion direction 201, which may be generally aligned with the direction of horizontal curvature 215, to cause the movable portion(s) of the attachment mechanism 224 to separate against the attractive force of the magnetic materials that bias the movable portion(s) toward one another.

The carrier may include a post 227 which connects the upper and lower portions of the carrier 222. The post 227 may define a distal side of the seat 231, and in the illustrated embodiment in FIG. 9, the distal end side of the passage 228. The post 227 may include a ramp 229 on the side opposite the seat or passage wall. In other words, the ramp 229 may be defined on a side of the carrier which faces the ramp 246-1 when the attachment mechanism 224 is positioned for coupling to the carrier. The ramp 229 may guide the ramp 246-1 on the lever portion as the temple, and thus the attachment mechanism, is moved in the insertion direction to temporarily urge the lever portion away from the tab portion. The ramp 229 may be inclined such that the thickness of the post 227 decreased from the passage 228 the distal end of the carrier 222. When the temple is attached to the lens, the post 227 is positioned between the magnetic material 261-1 and the temple hinge. As such, the post 227 may act to restrict movement of the lever portion and thus the attachment mechanism in the direction 215 when the attachment mechanism is engaged to the carrier (e.g., the lever portion is in the closed position).

Figure 11A:
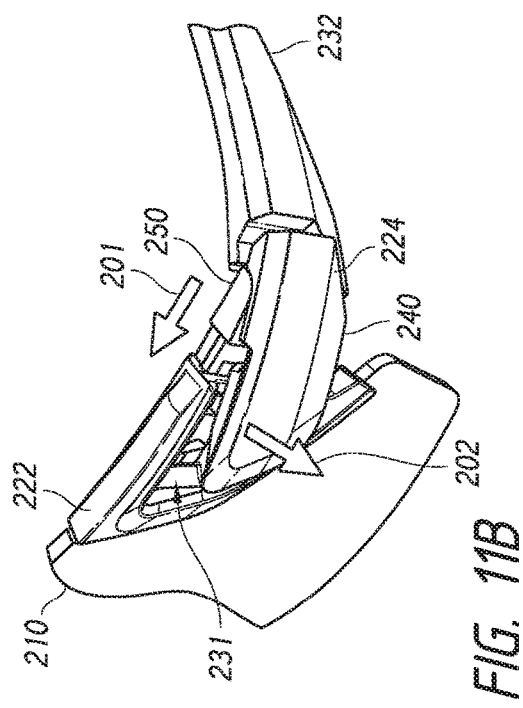
FIGS. 11A-11D are partial views of an eyewear in accordance with the present disclosure illustrating movement of one or more components of the eyewear during removal and attachment of a temple.
Figure 11B:
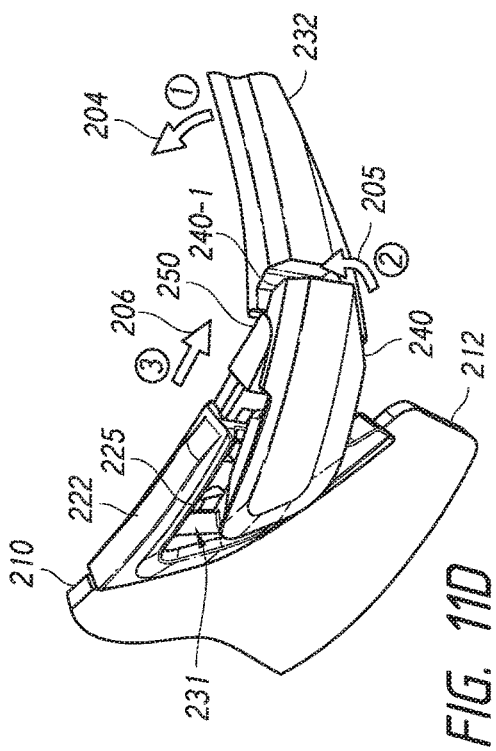
Figure 11C:
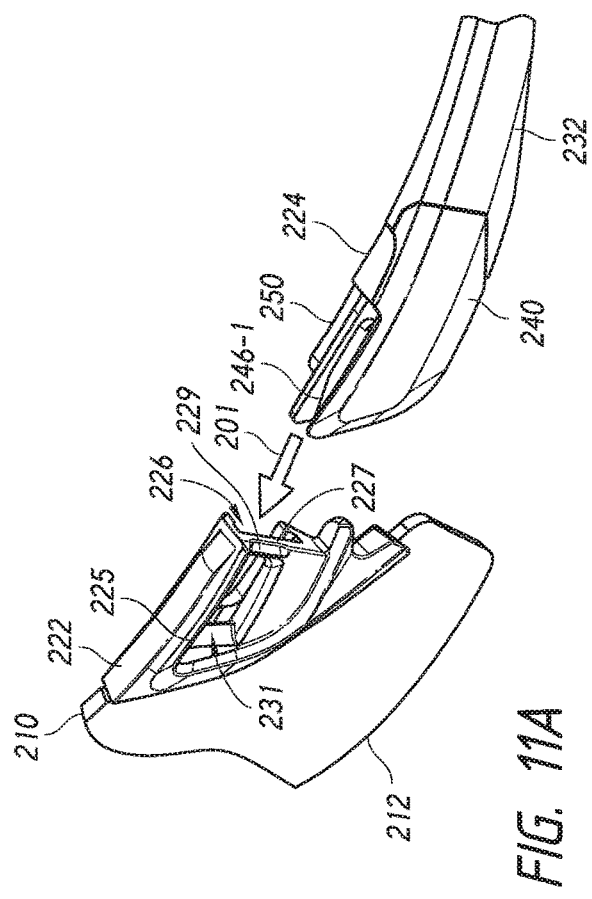

With reference now also to FIGS. 11A-11D, sequences for coupling and decoupling a lens to a temple in accordance with some examples are described in further detail below. FIGS. 11A-11C show a sequence for attaching the temple 232 to a lens assembly 210. As shown in FIG. 11A, the temple is moved in the direction of insertion 201. As the attachment mechanism 224 advances toward the carrier 222, the tab portion 250 may engage the rear channel 226, for example by sliding into the channel 226. As descried, the tab portion 250 and carrier 222 may be configured to allow the tab portion to slide freely into the channel 226. As the attachment mechanism 224 advances further toward the carrier 222, e.g., as shown in FIG. 11B, the lever portion 240 may be automatically guided away from the tab portion 250, e.g., in a direction generally away from the carrier, as shown by arrow 202 in FIG. 11B. By automatically, it is generally implied that the separation of the lever portion 240 from the tab portion 250 occurs without the application of user force to open the attachment mechanism but rather as the result of the cooperation of components of the attachment mechanism 224 (e.g., the cooperation of the ramps 229 and 246-1.

As the user continues to move the temple in the direction of insertion, the channel 226 guides the movement of the attachment mechanism 224 along the direction 201, until the lever portion 240, and specifically the housing 246 passes over the post 227, and the lever portion 240 engages the tab portion 250. Once the protruding part of the lever portion 240 has cleared the post 227, the lever portion 240 automatically pivots in the direction 203 snapping into the engagement (e.g., locked) position, as shown in FIG. 11C. The return of the lever portion 240 from the open position (as shown in FIG. 11B) to the closed position (as shown in FIG. 11C) is automatic (i.e. responsive to the magnetic attraction force, which acts along the direction 203) and without further application of user force. In this manner, a magnetic latching mechanism as described herein may enable the near effortless coupling of a temple to a lens, e.g., without requiring the user to perform a complex sequence of opening and closing the latch. All the user may be required to do is slide the temple into the carrier and the carrier and attachment mechanism 224 cooperate with one another to open and close the latch to secure the temple to the lens assembly. As the lever portion 240 returns to the closed position, the seat 231 facilitates the proper alignment and positioning of the lever portion 240 thus providing further alignment and a fit between the attachment mechanism 224 to the carrier 222, which may be substantially free of slop or play.

Figure 11D:
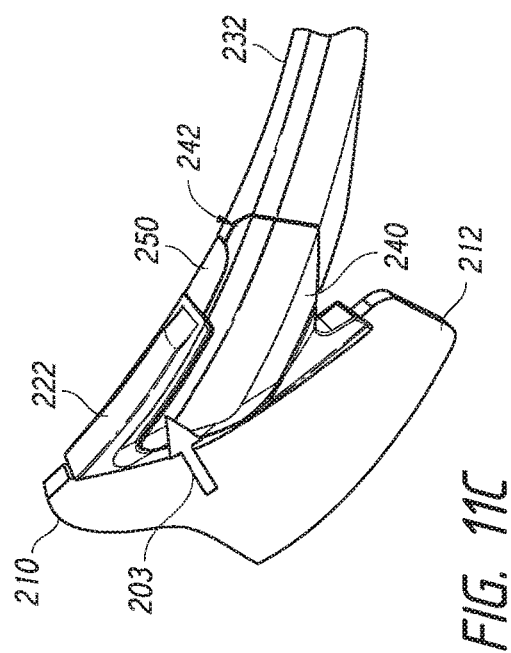

To separate the temple 232 from the lens assembly 210, the user may fold the temple 232 back towards the folded or stowage configuration of the eyewear, as shown by arrow 204 in a step numbered 1 in FIG. 11D. Pivoting the temple back in the direction 204 exposes a lever end 240-1 of the lever portion 240. The user applies a force on the lever end 240-1 as shown by arrow 205 to pivot the lever portion 240 about the pivot axis 207 (see e.g., FIG. 12A) away from the tab portion 250, allowing the tab portion to slide out of the channel in the direction 206, which may be generally opposite the direction of insertion, to remove the temple 232 from the lens 212. As previously described, the stop feature 245 may limit the separation of the tab and lever portions and thus enable the automatic return of the lever portion to the closed position once the lever portion has cleared the distal end of the carrier. In some examples, the ramps on the lever portion and carrier may also be configured (e.g., by selecting a suitable angle) to limit the separation between the lever portion and tab portion during insertion, while allowing the lever portion to clear the distal end of the carrier, which may similarly facilitate automatic return of the lever portion to the closed position.

As described, the front seat 231 and/or channel 225 may be configured to allow the lever portion 240 to pivot outward in a direction away from the lens (e.g., direction 202), while the rear seat (e.g., channel 226) may be configured to prevent the tab portion 250 from pivoting outwards in a direction away from the lens (e.g., direction 217 in FIG. 5A). In other embodiments, this functionality may be reversed, with the rear portion of the attachment mechanism 224 being freely pivotable outward while the front portion is pivotally restricted by the carrier 222 when coupled thereto. As will be appreciated, the combination of components described herein may facilitate a virtually effortless attachment and detachment of a temple to a carrier, which may provide a better user experience. The near effortless slidable engagement of the temple to lens assembly in accordance with the present disclosure may enable the user to install and remove a lens assembly without touching the lens surface (that is by only handling the lens assembly by the lens edges), which may address such shortcomings of existing interchangeable eyewear designs.

FIGS. 13-18 illustrate eyewear in accordance with further embodiments of the present disclosure. The eyewear 400 is a dual-lens eyewear, which includes a frame 430 and a pair of lenses 412 attached to the frame 430. Each of the lenses 412 may form part of a lens assembly, as will be further described. The frame 430 includes a front portion 436 (also referred to as rim), which extends at least along the upper periphery of the lenses 412. In some embodiments, the front portion 436 may also extend along the lower periphery of the lenses 412 thereby fully or substantially fully surrounding the lenses. The front portion 436 may include features for retaining the lenses in attachment therewith. For example, the front portion may include a groove and part of the periphery of each lens may be received therein. In some examples, the front portion may include one or more notches or slots configured to receiver one or more engagement features of the lens assembly. The front portion may include a bridge which is configured to rest against the user's nose. The bridge may include one or more of the components of the nose piece assembly 219, such as a removable and/or adjustable nose pad. Each of the temples 432 in the illustrated embodiment is pivotally connected to the front portion 436, although it is envisioned that in some embodiments, the temples may not be pivotal relative to the front portion and thus the lenses.

The eyewear 400 includes a magnetic attachment assembly 420 for removably attaching each of the lenses 412 to the frame 430. The magnetic attachment assembly 420 includes a magnetic attachment mechanism 424 coupled to or proximate each of the temples 432, and a carrier 422 attached to one end of each lens 412. The carrier 422 may be fixedly attached to a respective lens 412, for example by being bonded or mechanically joined to the lens, and the lens 412 and carrier 422 may form a lens assembly 410 which is removable from the frame 430. In the case of a dual-lens design, each lens assembly 410 is individually removably attachable to the frame 430. It is also envisioned that in some embodiments, a rimmed eyewear design may include two individual lenses or a single lens in a single sub-frame that incorporates the carriers and the sub-frame would be removably attachable to the frame in a similar manner as described herein.

As shown for example in FIG. 14, each lens 412 includes a carrier 422 attached to one end (e.g., a distal end 414a) of the lens 412. The carrier 422 includes an extension 425. Additionally, each lens 412 includes another extension 426 at the opposite (e.g., medial end 414b) of the lens. The carrier 422 is configured to engage a magnetic attachment mechanism, which may be arranged proximate the temple hinge, and the extension 426 is configured to engage the medial portion of the frame, as will be further described. FIG. 14 shows one of the pair of lenses 412 that are configured to couple to frame 230 and it will be understood that the other of the pair of lenses would be a mirror image of the illustrated lens having the same components and functionality described with reference to the lens in FIG. 14. In the partial view of eyewear 400 in FIG. 15 certain components have been removed (e.g., a front portion of the attachment mechanism 242) to illustrate features of the eyewear. Similarly, in the partial view in FIG. 15, certain components have been removed and certain features which are otherwise enclosed in the assembled configuration are shown in dashed line to ease the reader's understanding of the present disclosure.

In some embodiments, the attachment mechanism 424 includes a door 440 (also referred to as lever) and a backing portion 450. The door 440 may be pivotally coupled to the backing portion 450. The backing portion 450 may be part of the front portion 436 or the temple 432 and may thus be rigidly connected to or integrally formed therewith. The door 440 is pivotally coupled to the backing portion 450 to allow the attachment mechanism 424 to be provided in an open position for example for removing the lens 412. The door 440 may be pivotally coupled to the backing portion 450 and thus to the frame at the temple hinge 433 and may therefore share a common pivot axis 407 with the temple hinge 433. Using a common axis for the pivot of the attachment mechanism 424 and the hinge may provide a more compact design; however, it is envisioned that the door 440 may be pivotable about an axis different from the hinge axis, in cases in which the temple is hinged.

Figure 16:
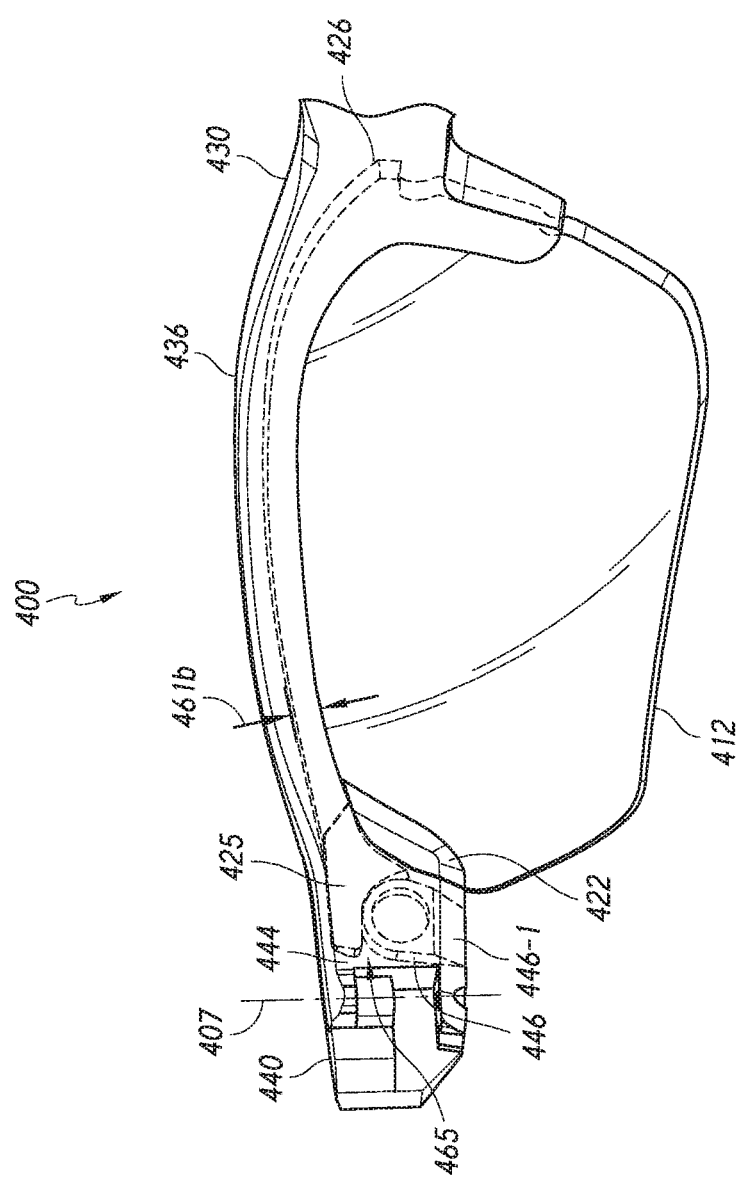
FIG. 16 is another partial view of the eyewear of FIG. 13 with one or more components removed for illustrative purposes.

As previously described, the attachment mechanism 424 may include a pair of magnetic materials (e.g., a pair of magnets, or a magnet and a piece of ferromagnetic material), which for the purposes of illustration have been removed from the views in FIGS. 15 and 16. The pair of magnetic materials is arranged on opposing faces of the door 440 and the backing portion 450 to urge the door 440 toward the backing portion 450. When the door is in the closed position (e.g., as shown in FIG. 13), a portion of the carrier 422 may be secured between the door 440 and backing portion 450 thus retaining the lens in attachment to the frame. A first magnetic material may be attached to the door 440 via a magnet housing 446, for example by being press fit or otherwise secured to the magnet housing 446. The magnet housing 446 may be configured to at least partially enclose a first magnetic material, such as by surrounding one or more walls of the magnetic material. The magnet housing 446 may protrude from a surface of the engagement side 444 of the door 440. As such the door 440 and backing portion 450 may define a cavity 465 therebetween. The cavity 465 may be generally defined by one or more surfaces of the magnet housing 446, the engagement side 444, and the rim 436.

A second magnetic material may be attached to the backing portion 450 via another magnet housing 456. The magnet housing 456 may be defined by a recess in a surface of the engagement side 454. The second magnetic material may similarly be press fit or otherwise secured to the magnet housing 456. The magnet housing 446 may be configured to at least partially enclose a second magnetic material, such as by surrounding one or more walls of the magnetic material. The second magnetic material may be arranged with respect to the magnet housing 456 such that the magnetic material does not protrude above the engagement side 454. In this manner, the carrier 422 can slide unobstructed into the cavity 465 when coupling the lens assembly 410 to the frame 430. In the illustrated embodiment, the magnetic materials (not shown) and correspondingly the magnet housings 446 and 456 are cylindrically shaped, although in other embodiments, they may be shaped in the form of triangular, square or rectangular prisms or have any other regular or irregular shape as may be desired. Depending on the shape of the housing 446, the extension 425 may be shaped for a cooperating fit therewith. For example, in the illustrated embodiment in which the housing is cylindrical, the lower end of the extension 425 is curved to allow the extension 425 to at least partially wrap around and abut the housing 446 when positioned in the cavity 465. This arrangement can provide a tighter fit between the removable lens and the frame.

The eyewear 400 may include one or more of the features of eyewear described with reference to other embodiments herein. For example the eyewear 400 may include one or more stop feature(s), which may limit the pivot angle of the door and thus enable automatic closure of the door after attaching or detaching the lens. In some embodiments, the eyewear 400 may include one or more ramps, which may cooperate to enable automatic opening of the door when attaching the lens. For example, as shown in FIGS. 14 and 15, the carrier may include a ramp 427, which may be provided near the upper edge of the extension 425. The magnet housing 446 may define another ramp 446-1 extending from a lower end of the door 440 toward the magnetic material seated in the housing 446. The ramp 446-1 may be inclined such that the thickness of the door 440 increased from the lower end of the door toward the magnetic material. Correspondingly, the ramp 427 may be inclined such that the thickness of the extension 425 decreased from the magnetic material toward the edge of the extension.

The ramp 427 may cooperate with a ramp 446-1 on the door 440 to force the door toward the open position against the force of magnetic attraction. Thus, when coupling the lens to the frame, the user need not specifically manipulate the eyewear to open the attachment mechanism but may instead simply slide the lens into place, as will be further described.

One or more features of the carrier, attachment mechanism and other components of the eyewear 400 may serve utilitarian and/or aesthetic functions. For example, and referring further to FIGS. 14-16, the carrier 422 may be attached to both the front and rear side of the lens, which may provide for a firmer connection between the lens and frame. In some embodiments, the extension 425 of the carrier 422 may define a ledge 463, which may provide a more aesthetically pleasing look of the eyewear when the lens is attached. For example, the ledge 463 may be thinner in profile than the overall thickness of the carrier 422 such that it can be accommodated in a relatively thinner cavity than the overall thickness of the carrier. A portion of the carrier that remains exposed when the extension is inserted in the cavity may be shaped to follow a contour of adjacent components of the frame which may provide an aesthetically pleasing look. In some embodiments, the carrier may be offset (e.g., by a distance 461a or 461b) from the upper edge of the frame and/or include shaping to allow the upper periphery of the lens 412 to be received in the frame (e.g., in a slot formed in the rim 436). In some embodiments, the offset distances in the front and rear side (e.g., front offset distance 461a and 461b) may differ, for example the rear offset distance may be greater which may provide a larger surface for the lens to rest against at the rear part of the frame. In other embodiments different arrangements may be used.

Figure 17A:
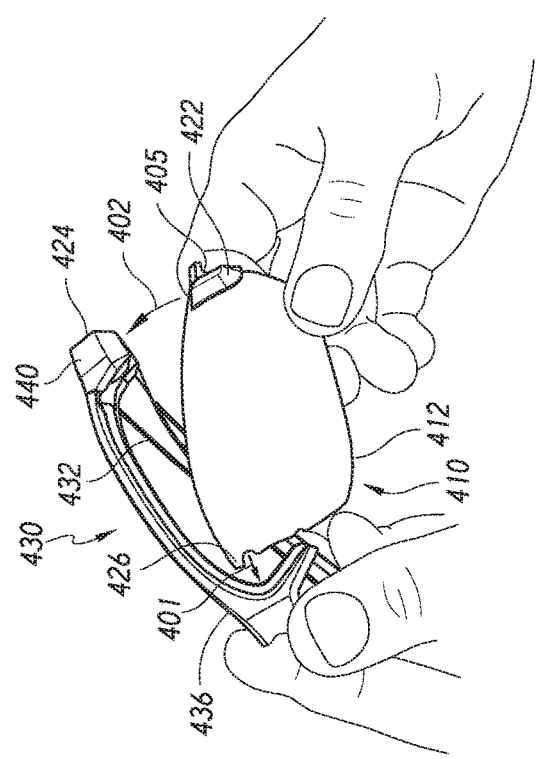
FIGS. 17A-17C show partial views of the eyewear of FIG. 14 illustrating movement of one or more components of the eyewear when coupling the lens assembly to the frame.
Figure 17B:
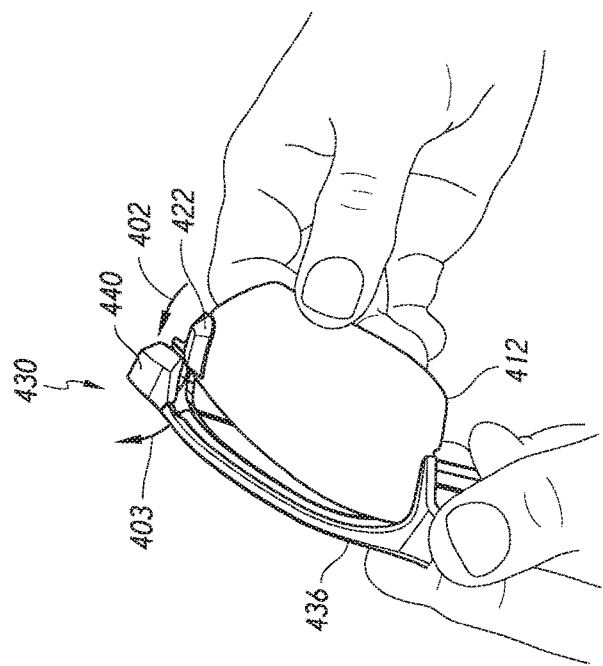
Figure 17C:
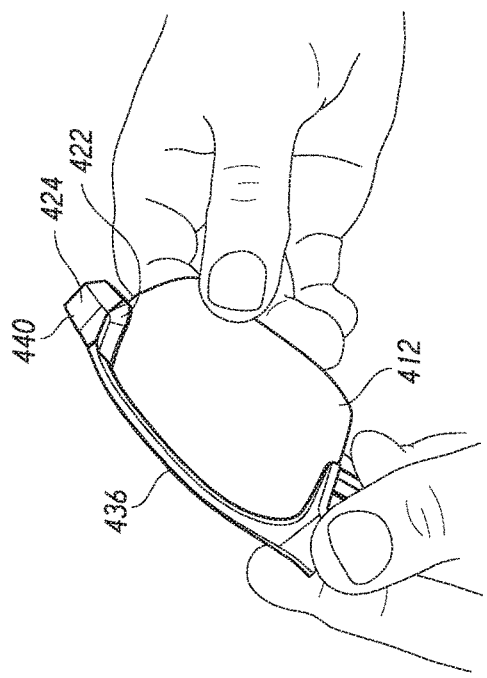

Referring now also to FIGS. 17 and 18, sequences for coupling and decoupling a lens to and from a frame are described in further detail below. FIGS. 17A-17C show a sequence for attaching a lens 412 to a frame 430. To attach the lens, the lens assembly 410 is advanced in a direction 401 to engage the extension 426 with the rim 436, as shown in FIG. 17A. The extension 426 may be toed into a slot or notch in the rim 436, which may function as a pivot location. The lens assembly 410 is then pivoted toward the frame 430, e.g., in the direction 402 as shown in FIGS. 17A and 17B. This pivotal action advances the carrier 422 toward the attachment mechanism 424. The ramp 427 on the carrier 422 and the ramp 446-1 on the door 440 cooperate to automatically open the door 440 (e.g., in a direction 403 away from the backing portion) thus allowing the extension 425 to slide into the cavity 465 between the door 440 and the rim 436. Once the extension 425 has cleared the protruding magnet housing on the door, the door 440 automatically returns to the closed position under the force of magnetic attraction, as shown in FIG. 17C. As described, the ramps are configured to allow the door 440 to open enough to allow the extension 425 to pass therebetween while remaining within the magnetic force field. The user need not manually open or close the attachment mechanism, which is configured to open and close automatically by the cooperation of components described herein. The user simply places one end of the lens into the frame and slides the other end into engagement with the attachment mechanism.

Figure 18A:
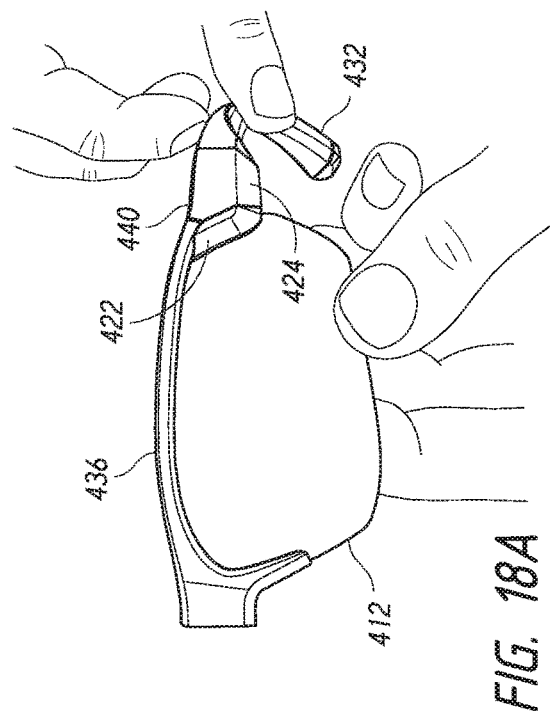
FIGS. 18A-18D show partial views of the eyewear of FIG. 14 illustrating movement of one or more components of the eyewear when decoupling or removing the lens assembly from the frame
Figure 18B:
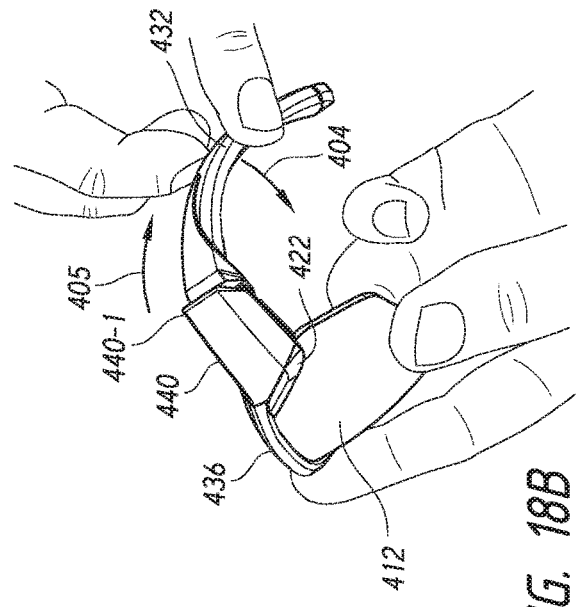
Figure 18C:
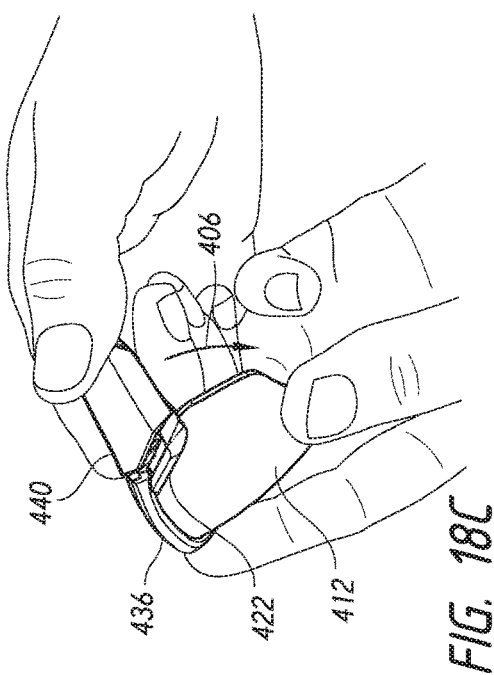
Figure 18D:
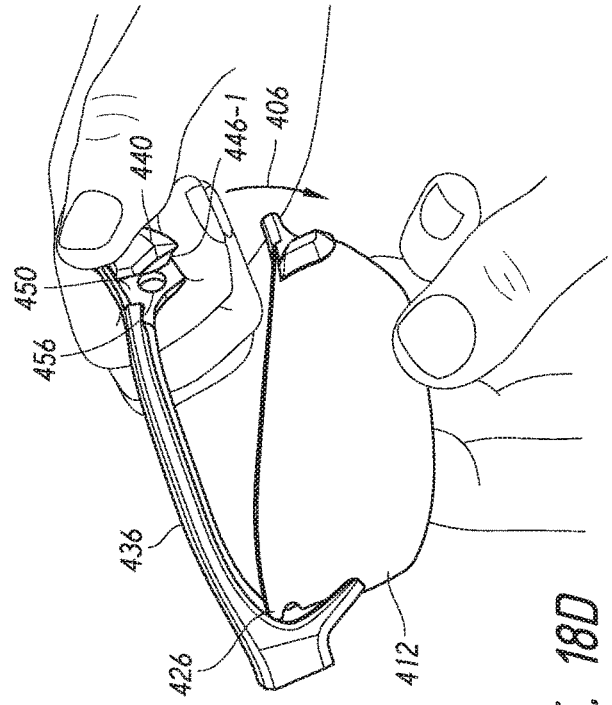

FIGS. 18A-18D show a sequence for removing the lens assembly 410 from the frame 430. To remove the lens, the temple 432 is pivoted back towards the folded configuration, e.g., along the direction 404 shown in FIG. 18B. As further shown in FIGS. 18B and 18C, this pivotal action exposes the lever end 440-1 of the door 440. The user may then apply a force on the lever end 440-1 along the direction 405 to pivot the door 440 into the open position. As shown in FIG. 18C, the user then pivots the lens 412 about the medial end of the lens, e.g., along the direction 406, to slide the carrier 422 out of engagement with the attachment mechanism 424 (e.g., out of the cavity 465). Once the carrier 422 has cleared the attachment mechanism 424, the extension 426 may be disengaged from the rim 436 and the lens separated from the frame 430, as shown in FIG. 18D. As previously described, stop features may be implemented to limit the amount to which the door 440 may be pivoted such that the door 440 and backing portion 450 may remain within the magnetic field and thus automatically close upon removal of the lens. As also described, in some embodiments, the temples may not be pivotally attached to the attachment mechanism and/or the rim. In such cases, an aperture may be formed in the temple to allow the pivotal component of the attachment mechanism (e.g., the door 440 or lever portion 240 of eyewear 200) to pivot to the open position without pivoting the temple from the as-worn configuration.

All relative and directional references (including: upper, lower, upward, downward, left, right, leftward, rightward, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An eyewear comprising and attachment assembly for removably magnetically attaching an eyewear temple to a lens of the eyewear, the attachment assembly comprising a carrier coupled to the lens and a magnetic latch configured to removably, couple to the carrier, wherein the magnetic latch comprises a first latch portion and a second latch portion coupled to the temple such that the first latch portion pivots in relation to the second latch portion, a magnet attached to one of the first and second latch portions, and a magnetic material attached to the other one of the first and second latch portions, wherein the magnet and the magnetic material are arranged on opposing sides of the first and second latch portions to urge the first and second portions in a first direction towards one another, and wherein the carrier is attached to a perimeter portion of the lens and is configured to restrict movement of at least one of the first and second latch portions in a second direction opposite the first direction.

2. The eyewear of claim 1, wherein the magnetic latch is pivotally coupled to the temple.

3. The eyewear of claim 1, wherein the first and second latch portions are pivotally coupled to the temple at a hinge axis of the temple.

4. The eyewear of claim 1, wherein the temple is pivotable between a folded configuration and an as-worn configuration, and wherein the temple is configured to prevent separation of the lens from the eyewear when the temple is in the as-worn configuration.

5. The eyewear of claim 1, wherein the carrier defines a channel configured to receive at least one of the first and second latch portions at least partially therein.

6. The eyewear of claim 5, wherein the channel includes at least one wall configured to restrict lateral movement of the received one of the first and second latch portions.

7. The eyewear of claim 1, wherein the carrier comprises a seat configured to align the first latch portion with respect to the carrier.

8. The eyewear of claim 7, wherein the seat is defined at least in part by a through passage connecting opposite sides of the carrier.

9. The eyewear of claim 8, wherein one of the first or second latch portions includes a magnet housing shaped for a cooperating fit with the passage.

10. The eyewear of claim 9, wherein the magnet housing includes a ramp and the passage includes an angled sidewall configured to abut the ramp when the magnetic latch is coupled to the carrier.

11. The eyewear of claim 10, wherein the carrier includes a post defining a distal side of the passage and wherein the post includes another ramp configured to cooperate with the ramp on the first latch portion to urge the first latch portion away from the second latch portion when coupling the magnetic latch to the carrier.

12. The eyewear of claim 11, wherein the attachment mechanism includes a stop feature configured to cooperate with the post to limit separation of the first and second latch portions during removal of the temple.

13. The eyewear of claim 1, wherein the attachment assembly is one of a pair of attachment assemblies of the eyewear, each of the pair of attachment assemblies positioned for coupling a respective one of a pair of temples to the eyewear.

14. The eyewear of claim 13, wherein the carriers of the pair of attachment assemblies form part of a rim of the eyewear, the rim configured to individually engage a respective one of the pair of temples for removably coupling the temples to the eyewear.

15. An interchangeable lens assembly for an eyewear with at least one removable temple having a magnetic latch with opposing moveably coupled first and second latch portions for removably attaching the removable temples to the lens assembly, wherein the lens assembly comprises a lens including at least one carrier arranged at a perimeter portion of the lens, wherein the carrier is configured to receive the first and second latch portions for removably coupling the magnetic latch to the lens by magnetic attraction of the first and second latch portions in a first direction, and wherein the carrier is further configured to restrict movement of at least one of the first and second latch portions in a second direction opposite the first direction.

16. The interchangeable lens assembly of claim 15, wherein the carrier defines a channel configured to receive at least one of the first and second latch portions at least partially therein.

17. The interchangeable lens assembly of claim 16, wherein the channel includes at least one wall configured to restrict lateral movement of the received one of the first and second latch portions.

18. The interchangeable lens assembly of claim 16, wherein the carrier includes a seat configured to prevent the first and second latch portions from contacting one another when the magnetic latch is coupled to the interchangeable lens assembly.

19. The interchangeable lens assembly of claim 16, wherein the lens comprises a first carrier disposed at a first perimeter portion of the lens and a second carrier disposed at a second perimeter portion of the lens, each configured for individually removably coupling a respective temple to the lens.

20. An eyewear comprising:
a frame including:
a rim;
first and second temples pivotally attached to the rim; and
first and second levers pivotally coupled to respective one of the first and second temples, wherein each of the levers includes a magnet housing enclosing, at least partially, a magnetic material, wherein the magnet housing defines a ramp extending from a lower end of the lever toward the magnetic material; and
first and second lens assemblies removably attached to the frame, wherein each of the first and second lens assemblies includes:
a lens;
a first extension located at a medial portion of the lens, wherein the first extension is configured to be received in a slot formed in a medial portion of the frame; and
a carrier attached to the lens opposite the first extension, wherein the carrier comprises a second extension configured to be slidably received in a cavity defined between the magnet housing and the rim.

\* \* \* \* \*